(12) United States Patent
Ahn

(10) Patent No.: US 11,691,514 B2
(45) Date of Patent: Jul. 4, 2023

(54) VEHICLE DISPLAY DEVICE

(71) Applicant: HYUNDAI MOBIS CO., LTD., Seoul (KR)

(72) Inventor: Sung Joon Ahn, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/667,881

(22) Filed: Feb. 9, 2022

(65) Prior Publication Data

US 2022/0250476 A1    Aug. 11, 2022

(30) Foreign Application Priority Data

Feb. 9, 2021   (KR) .................. 10-2021-0018695
Feb. 9, 2021   (KR) .................. 10-2021-0018696

(51) Int. Cl.
| | | |
|---|---|---|
| *B60K 37/06* | (2006.01) | |
| *B60K 35/00* | (2006.01) | |
| *G05G 1/10* | (2006.01) | |
| *G05G 9/047* | (2006.01) | |

(52) U.S. Cl.
CPC .......... *B60K 37/06* (2013.01); *B60K 35/00* (2013.01); *G05G 1/10* (2013.01); *G05G 9/047* (2013.01); *B60K 2370/11* (2019.05); *B60K 2370/126* (2019.05); *G05G 2009/04751* (2013.01)

(58) Field of Classification Search
CPC ..................................... B60K 35/00
See application file for complete search history.

(56) References Cited

U.S. PATENT DOCUMENTS

| | | | | |
|---|---|---|---|---|
| 2005/0263255 A1* | 12/2005 | Phoy | ............... | E06B 9/264 |
| | | | | 160/98 |
| 2007/0125914 A1* | 6/2007 | Liou | ............... | F16M 11/24 |
| | | | | 248/122.1 |
| 2015/0054608 A1 | 2/2015 | Sun et al. | | |
| 2015/0177176 A1* | 6/2015 | Massari | ............... | G01N 33/48785 |
| | | | | 204/406 |
| 2017/0153718 A1* | 6/2017 | Brown | ............... | B60K 37/06 |

(Continued)

FOREIGN PATENT DOCUMENTS

| | | |
|---|---|---|
| EP | 2839995 A1 | 2/2015 |
| KR | 20020087808 A | 11/2002 |
| KR | 101386070 B1 | 4/2014 |

OTHER PUBLICATIONS

Partial European Search Report dated Jun. 22, 2022 in corresponding European Patent Application No. 22155785.3.

*Primary Examiner* — Nan-Ying Yang
(74) *Attorney, Agent, or Firm* — NovoTechIP International PLLC

(57) ABSTRACT

A vehicle display device according to an embodiment of the disclosure includes a display that displays, as an image, functions for various pieces of vehicle operation information, a knob that is electrically interlocked with the display and selectively operates a corresponding function of the display according to left-right movement thereof, a guide rail that provides a movement path of the knob and divides a plurality of functional areas interlocked with the functions displayed on the display, and a guide part in which magnets having different polarities are alternately arranged in a lengthwise direction of the guide rail to automatically guide a location of the knob.

20 Claims, 26 Drawing Sheets

(56) References Cited

U.S. PATENT DOCUMENTS

| | | | |
|---|---|---|---|
| 2018/0107320 A1 | 4/2018 | Im et al. | |
| 2018/0210551 A1* | 7/2018 | Kitagawa | G06F 3/04847 |
| 2018/0297212 A1 | 10/2018 | Kino | |
| 2018/0373350 A1* | 12/2018 | Rao | B60K 35/00 |
| 2020/0341502 A1* | 10/2020 | Yokosuka | F16H 59/044 |

* cited by examiner

VEHICLE DISPLAY DEVICE

CROSS-REFERENCE TO RELATED APPLICATIONS

This application claims priority to and the benefit of Korean Patent Application No. 10-2021-0018695, filed on Feb. 9, 2021, and Korean Patent Application No. 10-2021-0018696, filed on Feb. 9, 2021, the disclosure of which is incorporated herein by reference in their entirety.

BACKGROUND

1. Technical Field

This disclosure relates to a vehicle display device.

2. Discussion of Related Art

According to the related art, technologies for providing content according to the selection of an occupant or a driving situation by providing a vehicle display device have been proposed.

However, in the related art, since a form in which the vehicle display devices are fixedly disposed in front of a driver seat and a passenger seat is merely proposed, there is a limitation in providing a service.

SUMMARY

The disclosure is directed to providing a vehicle display device in which a sliding knob and a display are integrated, thereby securing the degree of freedom of a slimmed cockpit room and realizing intuitive operation convenience.

In particular, the disclosure is also directed to providing a vehicle display device in which a location recognition rate of a knob is improved so that malfunction of a sliding knob may be prevented, and the knob may accurately move to a corresponding mode location according to an operation of a user.

Further, the disclosure is also directed to providing a vehicle display device capable of implementing intuitive operation convenience by eliminating a wire structure of the sliding knob and integrating the sliding knob with the display to secure the degree of freedom of a slimmed cockpit room.

The aspects of the disclosure are not limited to the aspects described above, and those skilled in the art will clearly understand other aspects not described herein from the following description.

According to an aspect of the disclosure, there is provided a vehicle display device including a display that displays, as an image, functions for various pieces of vehicle operation information, a knob that is electrically interlocked with the display and selectively operates a corresponding function of the display according to left-right movement thereof, a guide rail that provides a movement path of the knob and divides a plurality of functional areas interlocked with the functions displayed on the display, and a guide part in which magnets having different polarities are alternately arranged in a lengthwise direction of the guide rail to automatically guide a location of the knob.

The guide part may include a first magnet arranged at each of the functional areas of the guide rail, and a second magnet which is arranged near the first magnet and in which a polarity of a portion in contact with the knob is different from that of the first magnet, wherein the knob includes a magnetic body in which a section in contact with the guide part has a polarity equal to that of the first magnet so that an attractive force acts between the first magnet and the magnetic body and a repulsive force acts between the second magnet and the magnetic body.

The guide part may further include a cover plate having a first seating groove on which the first magnet is seated and a second seating groove on which the second magnet is seated.

The first seating groove and the second seating groove may be formed at intervals in the lengthwise direction of the guide rail and have one open surfaces, the open surface of the first seating groove is formed outside the guide rail, and the open surface of the second seating groove is formed inside the guide rail.

The first seating groove may have a size corresponding to the first magnet, and the second seating groove may have a size corresponding to the second magnet.

The guide part may include a locking groove recessed in each of the functional areas located at regular intervals in the lengthwise direction of the guide rail, and the locking groove may divide location areas of the knob interlocked with the functions of the display.

The knob may include a ball plunger using a ball spring type that is fitted in the locking groove when the knob moves in the lengthwise direction of the guide rail.

The knob may be spaced apart from the first magnet by a predetermined gap.

The knob may be wirelessly connected to the display in an ultra-wide band (UWB) manner.

The knob may include a liquid crystal display (LCD) that displays, as an image, a widget interlocked with an image for each of the functions of the display, and a time-of-flight (ToF) sensor having a view angle in an image display direction of the LCD may be provided at a lower end of the knob.

The guide rail may include a plurality of position sensors arranged at regular intervals in a lengthwise direction and arranged at the functional areas, and the position sensors may detect the location of the knob to transmit the detected location to an electronic control unit (ECU).

According to another aspect of the disclosure, there is provided a vehicle display device including a display that displays, as an image, functions for various pieces of vehicle operation information, a knob that is electrically interlocked with the display and selectively operates a corresponding function of the display according to left-right movement thereof, a guide rail that provides a movement path of the knob, and a guide part that is spaced apart from an upper end of the guide rail, provides a guide path in the form of a zigzag-curved shape in a lengthwise direction, and divides a plurality of functional areas interlocked with the functions displayed on the display.

The knob may have a spring roller including a roller part that is rotationally adjusted along the guide path of the guide part and an elastic part disposed at a lower end of the roller part and vertically adjusted.

The guide path of the guide part may be formed by alternately arranging a protrusion section and a recessed section having an inclined structure.

An uppermost end of the recessed section may be a fixed position of the knob corresponding to each of the functional areas of the display.

BRIEF DESCRIPTION OF THE DRAWINGS

The above and other objects, features and advantages of the disclosure will become more apparent to those of ordinary skill in the art by describing exemplary embodiments thereof in detail with reference to the accompanying drawings, in which.

DETAILED DESCRIPTION

Advantages and features of the disclosure and a method of achieving the advantages and the features will become apparent with reference to embodiments described below in detail together with the accompanying drawings. However, the disclosure is not limited to the embodiments described below but will be implemented in various forms, and the present embodiments merely make the disclosure of the disclosure complete.

The embodiments are provided to completely inform the scope of the disclosure to those skilled in the art, to which the disclosure belongs, and the disclosure is defined by the description of the appended claims. Meanwhile, terms used in the present specification are intended to describe the embodiments and are not intended to limit the disclosure. In the present specification, a singular form also includes a plural form unless specifically described in a phrase. The term "comprise" or "comprising" used herein does not exclude the presence or addition of one or more other components, steps, operations, and/or elements in addition to components, steps, operations, and/or elements described above.

Hereinafter, exemplary embodiments of the disclosure will be described in detail with reference to the accompanying drawings.

First Embodiment

Figure 1:
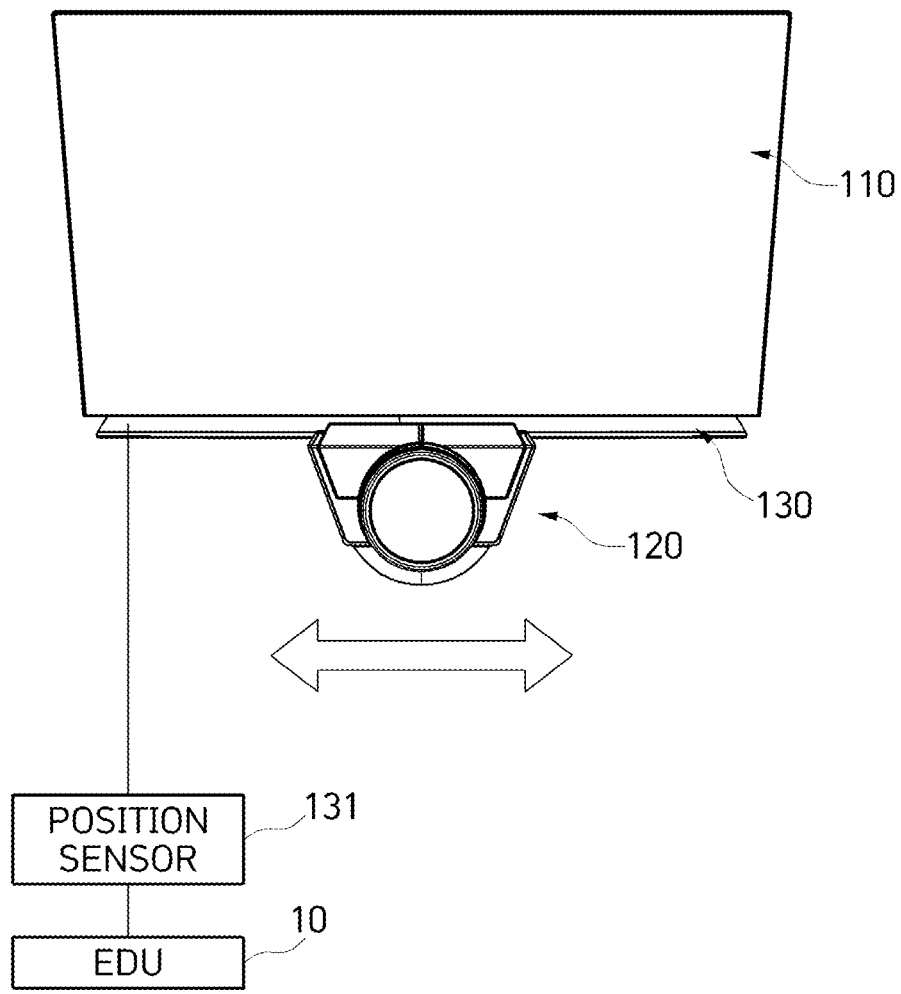
FIG. 1 is a schematic front view illustrating a vehicle display device according to a first embodiment of the disclosure.
Figure 2:
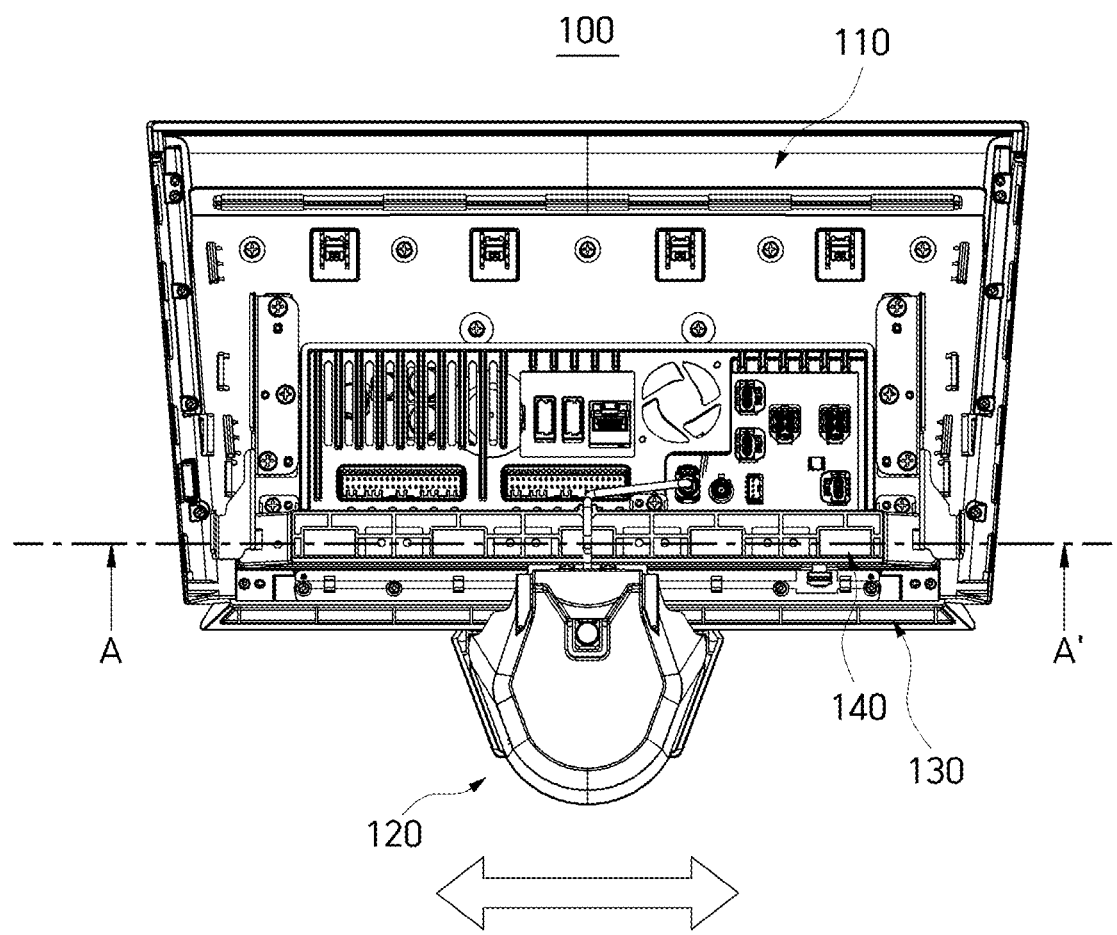
FIG. 2 is a schematic rear view illustrating the vehicle display device according to the first embodiment of the disclosure.

FIGS. 1 and 2 are schematic front and rear views illustrating a vehicle display device according to a first embodiment of the disclosure.

A vehicle display device 100 illustrated in FIGS. 1 and 2 according the first embodiment of the disclosure is located between a driver seat and a passenger seat in a cockpit. The vehicle display device 100 includes a display 110, a knob 120, a guide rail 130, and a guide part 140.

A basic concept of the vehicle display device 100 is a structure in which the knob 120 and the display 110 are interlocked with each other, and the display 110 switches and displays images for functions for various pieces of vehicle operation information according to left-right movement of the knob 120.

In this case, since the display 110 is located on a center fascia as a large screen, it is difficult to provide a space in which surrounding electronic units are arranged. Thus, instead of an existing physical button having a function for the vehicle operation information, the display 110 displays the corresponding function as a widget image.

Accordingly, the display 110 may improve intuitiveness and operability by reducing a depth and an operation step of a menu for the corresponding function displayed as a widget.

The knob 120 may be electrically interlocked with the display 110 to selectively operate various functions of the display 110 according to the left-right movement. This knob 120 has a structural mechanism that may slide at a lower end of the display 110.

The guide rail 130 provides a movement path of the knob 120. In this case, the guide rail 130 divides a plurality of functional areas that are interlocked with the widgets of the functions displayed on the display 110. Here, the display 110 switches and displays images for the respective functions for the vehicle operation information whenever the knob 120 is located in the functional areas.

The guide rail 130 may include a plurality of position sensors 131 arranged at regular intervals in a lengthwise direction and arranged in the respective functional areas.

Here, the position sensors 131 detect a location of the knob 120 when the knob 120 moves leftward or rightward in the lengthwise direction of the guide rail 130 and transmit the detected data to an electronic control unit (ECU) 10.

The ECU 10 may compare reference data with the detected data of the knob 120 received from the position sensors 131 and control, on the basis of the compared value, the display 110 to display the widget of the corresponding function as an image.

The guide part 140 has a function of automatically guiding the location of the knob 120 in a state in which magnets having different polarities are alternately arranged in the lengthwise direction of the guide rail 130.

Figure 3:
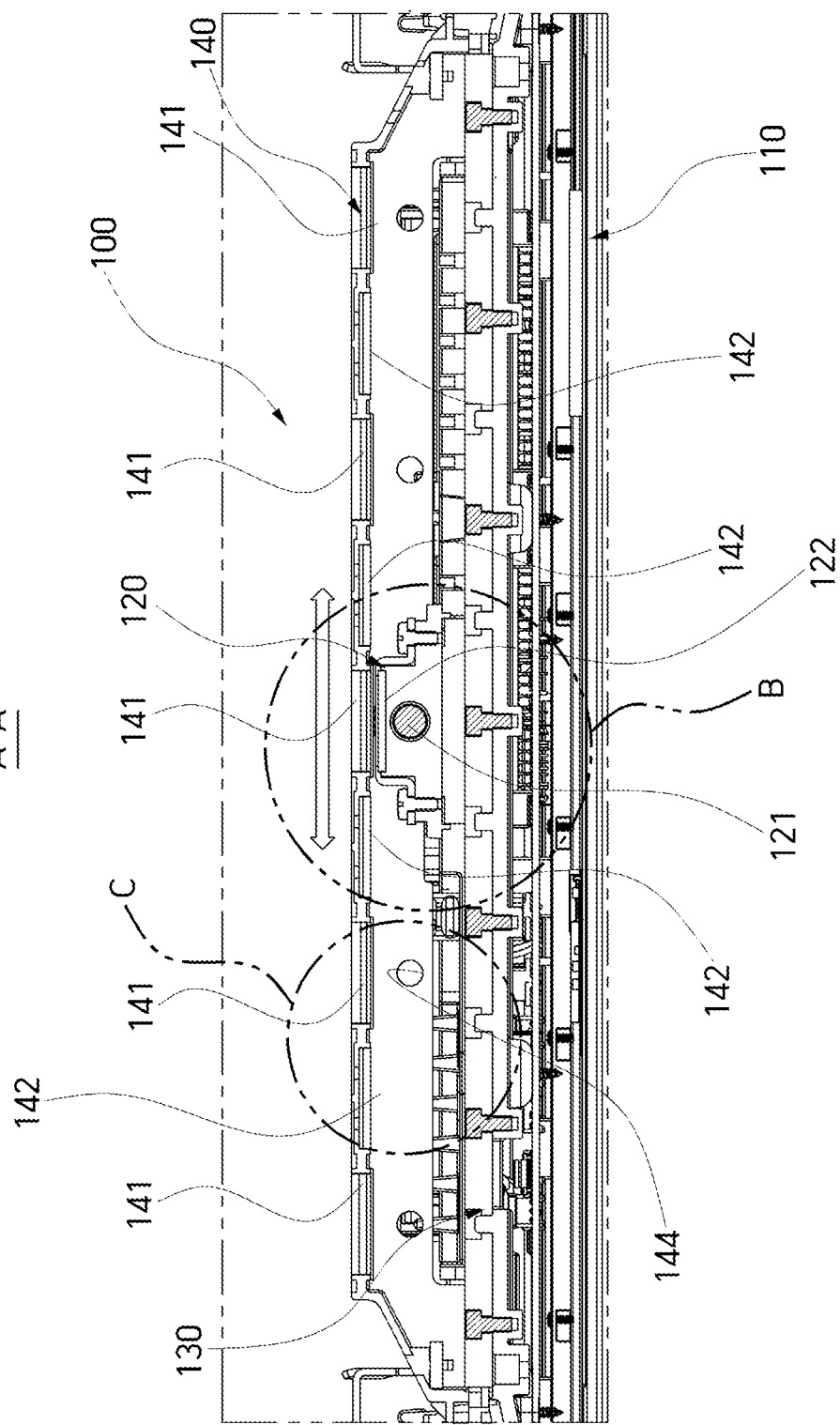
FIG. 3 is a cross-sectional view taken along line A-A' of FIG. 2.
Figure 4:
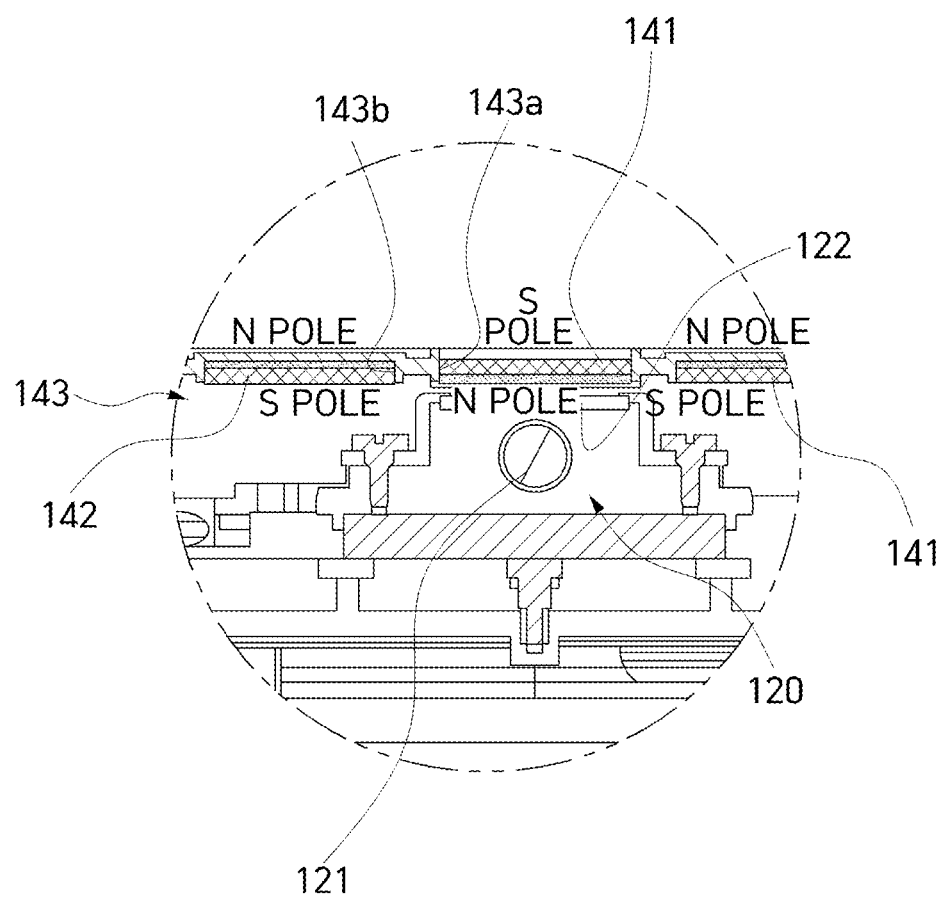
FIG. 4 is an enlarged view illustrating portion B of FIG. 3.
Figure 5:
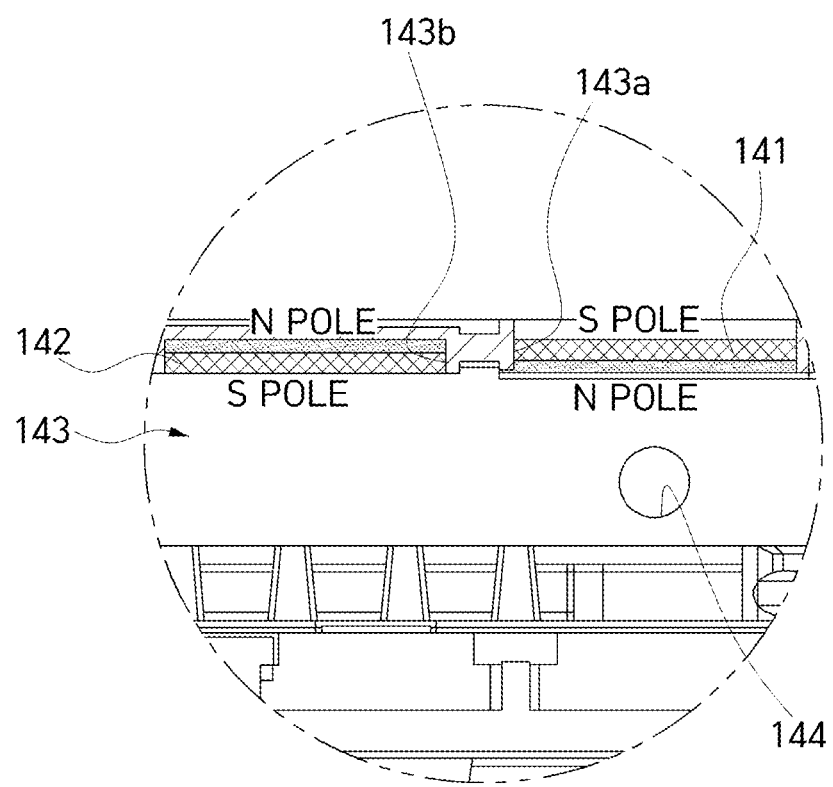
FIG. 5 is an enlarged view illustrating portion C of FIG. 3.
Figure 6:
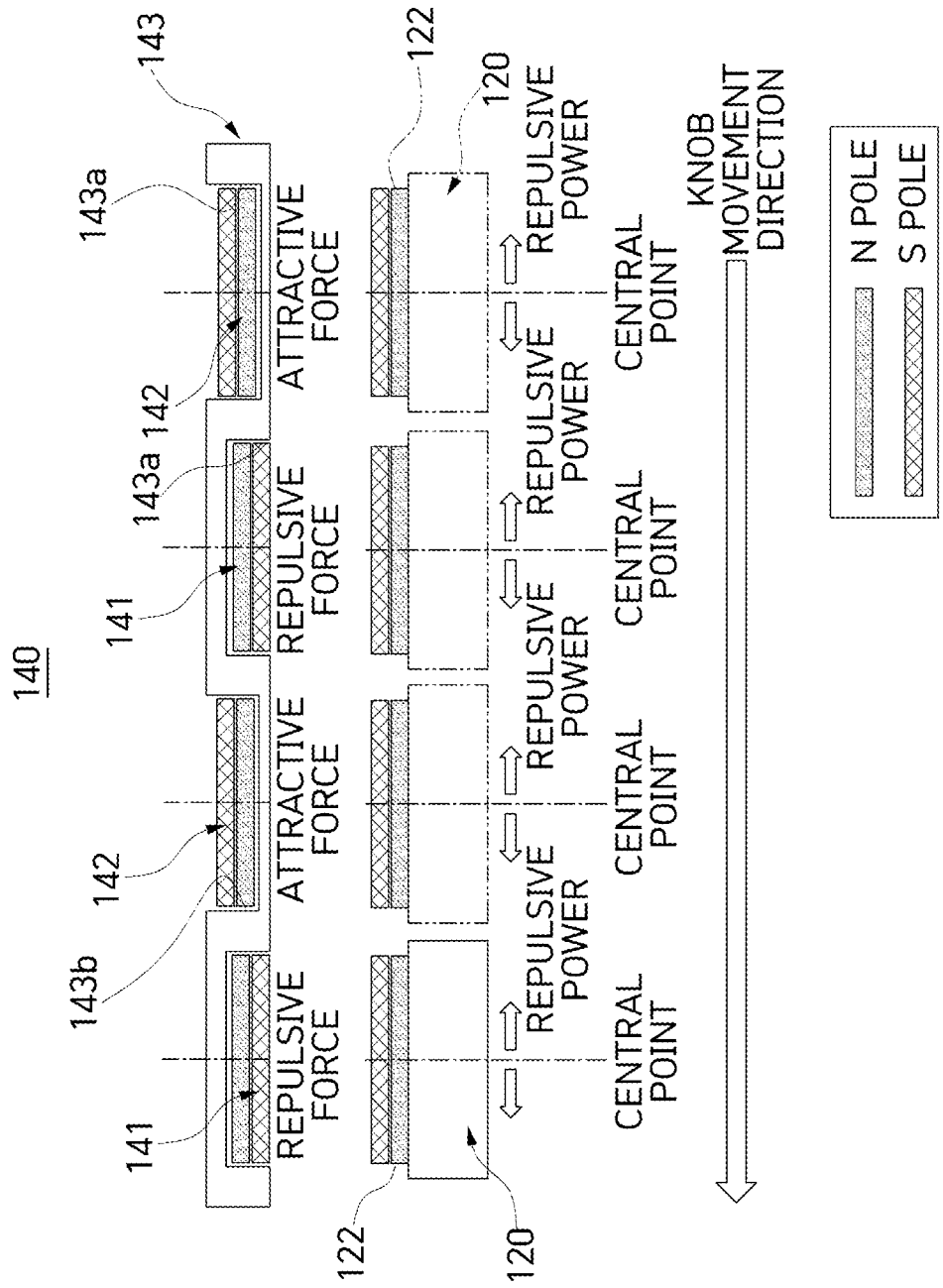
FIG. 6 is a schematic exemplary view illustrating a state in which a location of a knob is corrected due to an action of an attractive force and a repulsive force of a magnetic field in the vehicle display device according to the first embodiment of the disclosure.
Figure 7:
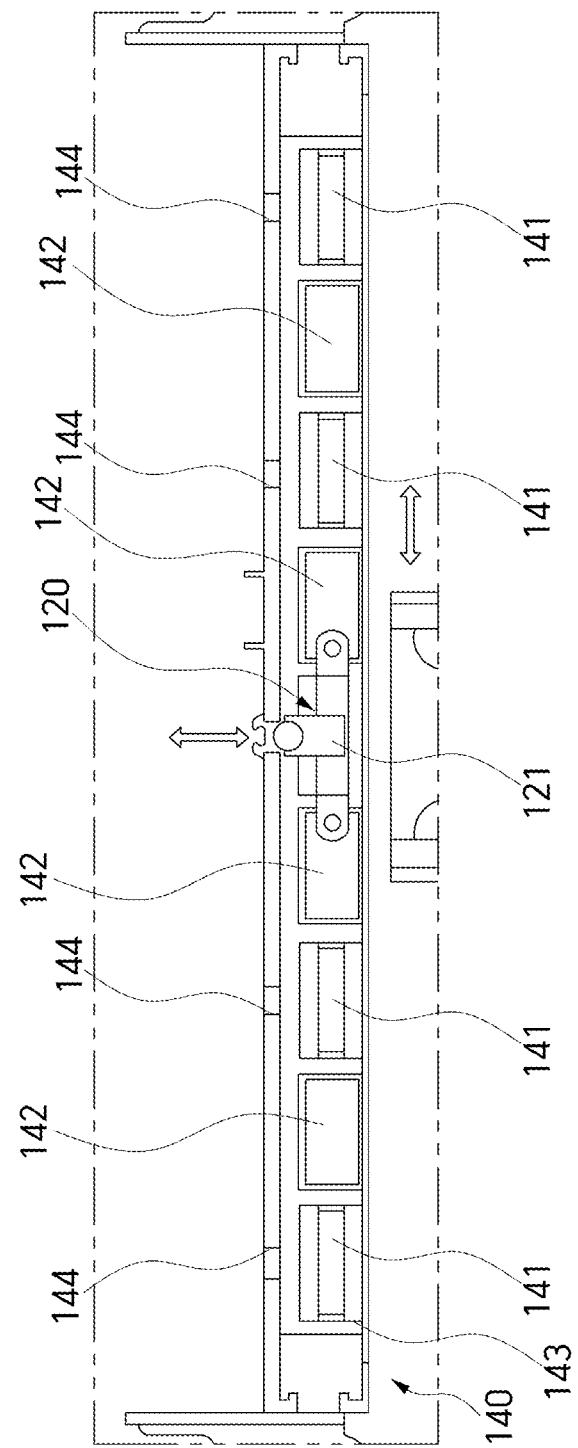
FIG. 7 is a schematic cross-sectional view illustrating a structure of a ball plunger of the knob in the vehicle display device according to the first embodiment of the disclosure.

FIG. 3 is a cross-sectional view taken along line A-A' of FIG. 2, FIG. 4 is an enlarged view illustrating portion B of FIG. 3, FIG. 5 is an enlarged view illustrating portion C of FIG. 3, FIG. 6 is a schematic exemplary view illustrating a state in which a location of a knob is corrected due to an action of an attractive force and a repulsive force of a magnetic field, and FIG. 7 is a schematic cross-sectional view illustrating a structure of a ball plunger.

Referring to FIGS. 3 to 7, the guide part 140 includes a first magnet 141 and a second magnet 142.

The first magnet 141 is disposed in each functional area of the guide rail 130.

The second magnet 142 is disposed near the first magnet 141, and the polarity of a portion of the second magnet 142 in contact with the knob 120 is different from that of the first magnet 141. Here, the knob 120 may include a magnetic body 122 in which a section in contact with the guide part 140 has a polarity different from that of the first magnet 141 and equal to that of the second magnet 142 so that an attractive force acts between the first magnet 141 and the magnetic body 122 and a repulsive force acts between the second magnet 142 and the magnetic body 122.

For example, as illustrated in FIG. 4, an N pole of the first magnet 141 is located in contact with the magnetic body 122 of the knob 120. Here, the polarity of a portion the magnetic body 122 of the knob 120 in contact with the first magnet 141 is an S pole. In contrast, an S pole of the second magnet 142 is located in a section in contact with the S pole of the magnetic body 122. Thus, the attractive force acts between the first magnet 141 and the magnetic body 122 of the knob 120, and the repulsive force acts between the second magnet 142 and the magnetic body 122 of the knob 120. Through this structural mechanism between the knob 120 and the guide part 140, the location of the knob 120 is automatically corrected for each functional area. Thus, even when a user stops moving the knob 120 in the middle, the location of the knob 120 is recognized, and thus malfunction can be prevented.

The guide part 140 may further include a cover plate 143 having a first seating groove 143a on which the first magnet 141 is seated and a second seating groove 143b on which the second magnet 142 is seated.

The first and second seating grooves 143a and 143b are formed at regular intervals in the lengthwise direction of the guide rail 130.

The first and second seating grooves 143a and 143b have one open surfaces, the open surface of the first seating groove 143a may be formed outside the guide rail 130, and the open surface of the second seating groove 143b may be formed inside the guide rail 130.

For example, the first and second seating grooves 143a and 143b may have an "S" structure in which different open surfaces are arranged.

In this case, the first seating groove 143a may have a size corresponding to the first magnet 141, and the second seating groove 143b may have a size corresponding to the second magnet 142. Here, it is preferable that the area of the first and second seating grooves 143a and 143b corresponds to the size of the first and second magnet 141 and 142, and the area of the first and second seating grooves 143a and 143b may be relatively larger than the area of the first and second magnets 141 and 142.

The guide part 140 includes a locking groove 144 that is recessed in each of the functional areas located at regular intervals in the lengthwise direction of the guide rail 130, and the locking groove 144 may divide location areas of the knob 120 interlocked with the functions of the display 110.

The knob 120 may include a ball plunger 121 of a ball spring type that is fitted in the locking groove 144 when the knob 120 moves in the lengthwise direction of the guide rail 130.

The knob 120 may be spaced apart from the first magnet 141 by a preset predetermined gap. Here, the predetermined gap may correspond to the thickness of the first seating groove 143a on which the first magnet 141 is seated.

The magnetic body 122 of the knob 120 may not be in direct contact with the first magnet 141 but may be in contact with a closed surface of the first seating groove 143a. This is because, when the knob 120 moves, and when the knob 120 comes into direct contact with the first magnet 141, the movement itself may be a problem due to the attractive force therebetween.

In contrast, when the knob 120 moves, the repulsive force acts between the magnetic body 122 and the second magnet 142. Thus, in order to prevent the second magnet 142 from being separated to the outside due to the repulsive force, the second groove 143b has an open inner side and a closed outer side. In this case, the thickness of the second seating groove 143b may be greater than the thickness of the first seating groove 143a.

Change Structure of UI of Display

Example for Each Function According to Knob Operation

Figure 8:
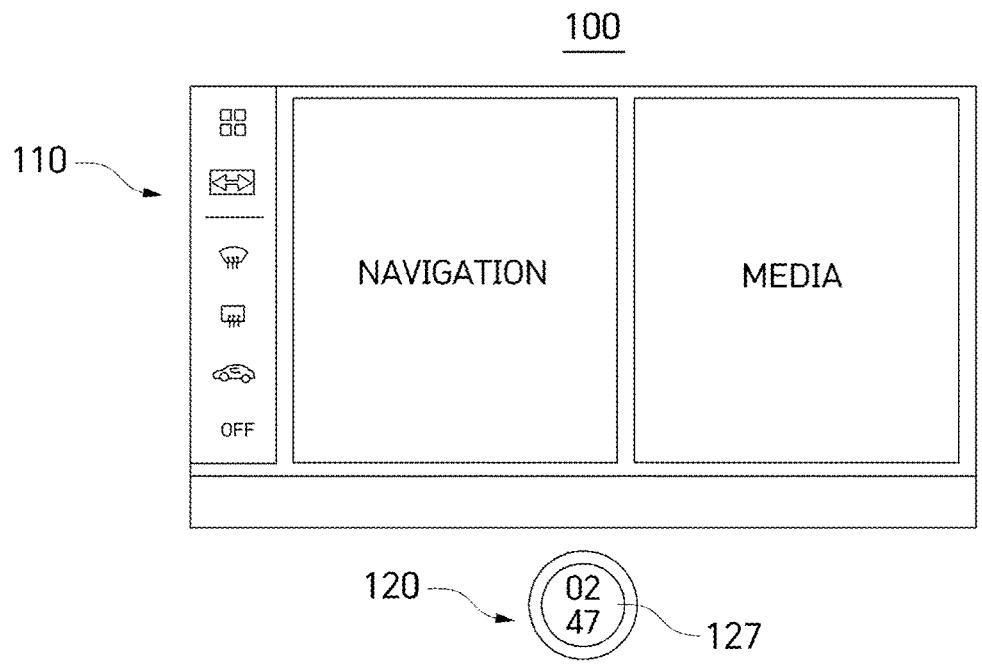
FIGS. 8 and 9 are schematic views illustrating a change structure of a user interface (UI) according to an operation intention of the knob in the vehicle display device according to the first embodiment of the disclosure.
Figure 9:
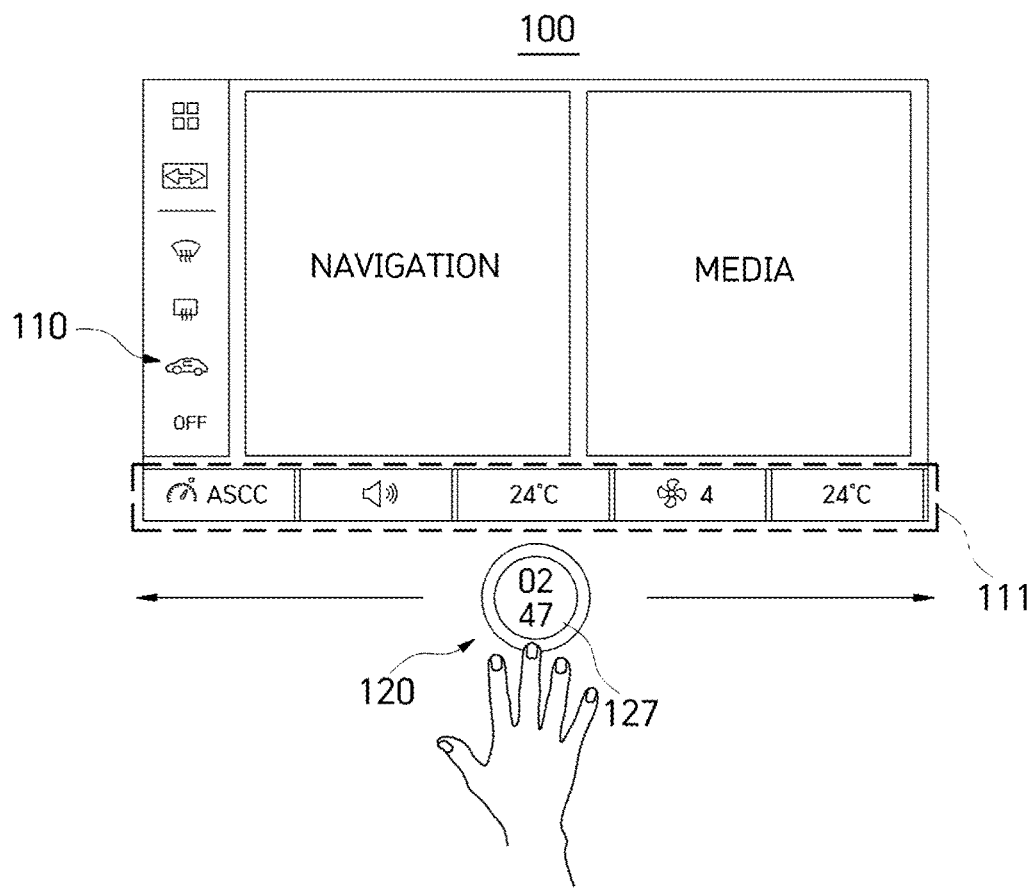

FIGS. 8 and 9 are schematic views illustrating a change structure of a user interface (UI) according to an operation intention of the knob in the vehicle display device according to the first embodiment of the disclosure.

Referring to FIGS. 8 and 9, when the user operates the knob 120, the display 110 displays, as a UI, a function related to the vehicle operation information.

In this case, in a function widget 111 displayed at a lower end of the display 110, five functions are partitioned according to locations. When the knob 120 moves to a location corresponding to each of the functions partitioned in the function widget 111, as the function widget 111 interlocked with the knob 120 is activated, an image for the corresponding function is displayed on the display 110.

Figure 10:
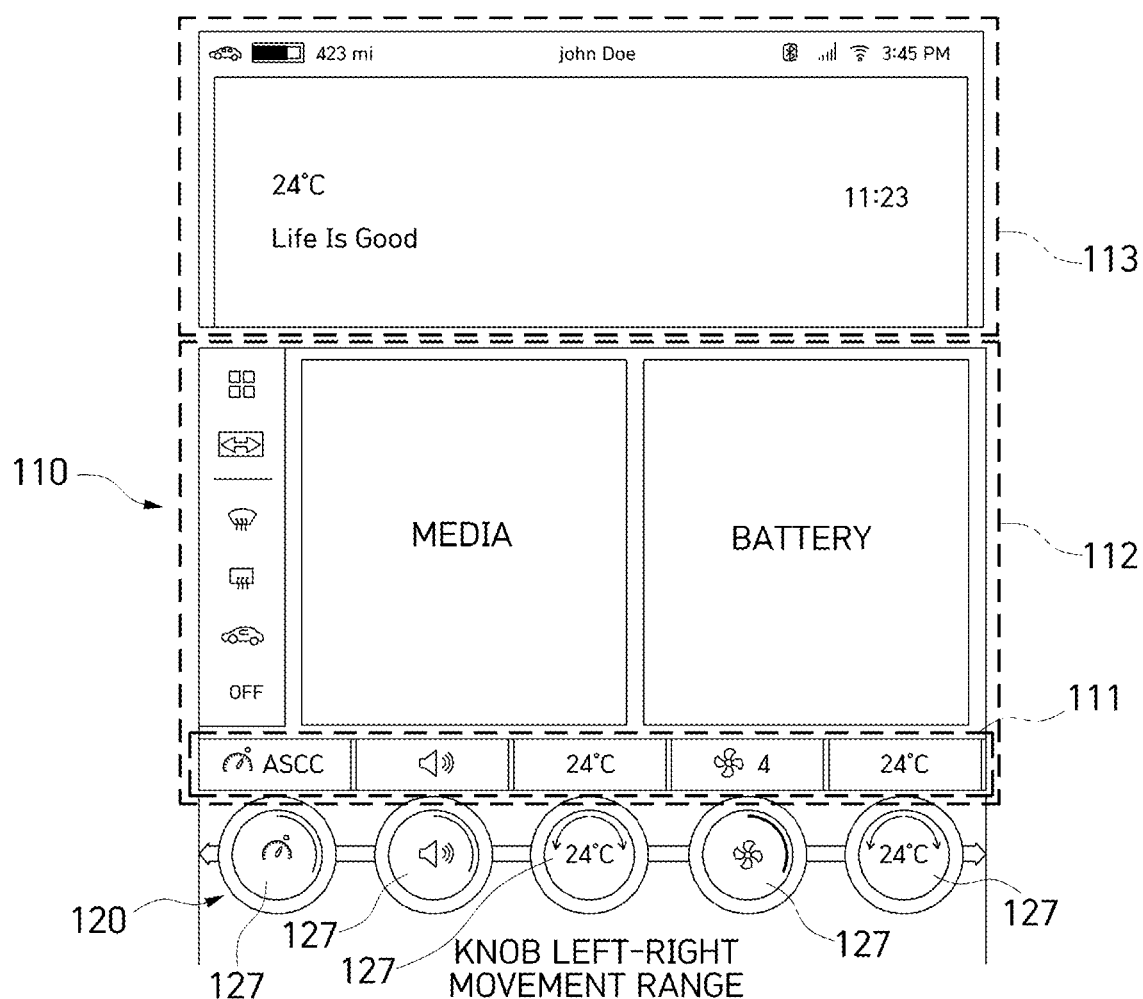
FIG. 10 is an exemplary view illustrating a state in which each function is displayed on a display by operating the knob in the vehicle display device according to the first embodiment of the disclosure.

FIG. 10 is an exemplary view illustrating a state in which each function is displayed on a display by operating the knob in the vehicle display device according to the first embodiment of the disclosure.

Referring to FIG. 10, in the display 110, the function widget 111, a lower display 112, and an upper display 113 basically display images for areas.

The function widget 111 may display, as widget icons, a plurality of the functions related to the vehicle operation information, and the lower display 112 and the upper display 113 may display, as images, detailed contents related to the function widget 111.

As illustrated in FIG. 10, in the function widget 111, the five functions are partitioned and displayed according to locations. This is merely one example, but the disclosure is not limited thereto, and in the function widget 111, a plurality of N functions may be displayed.

Figure 11:
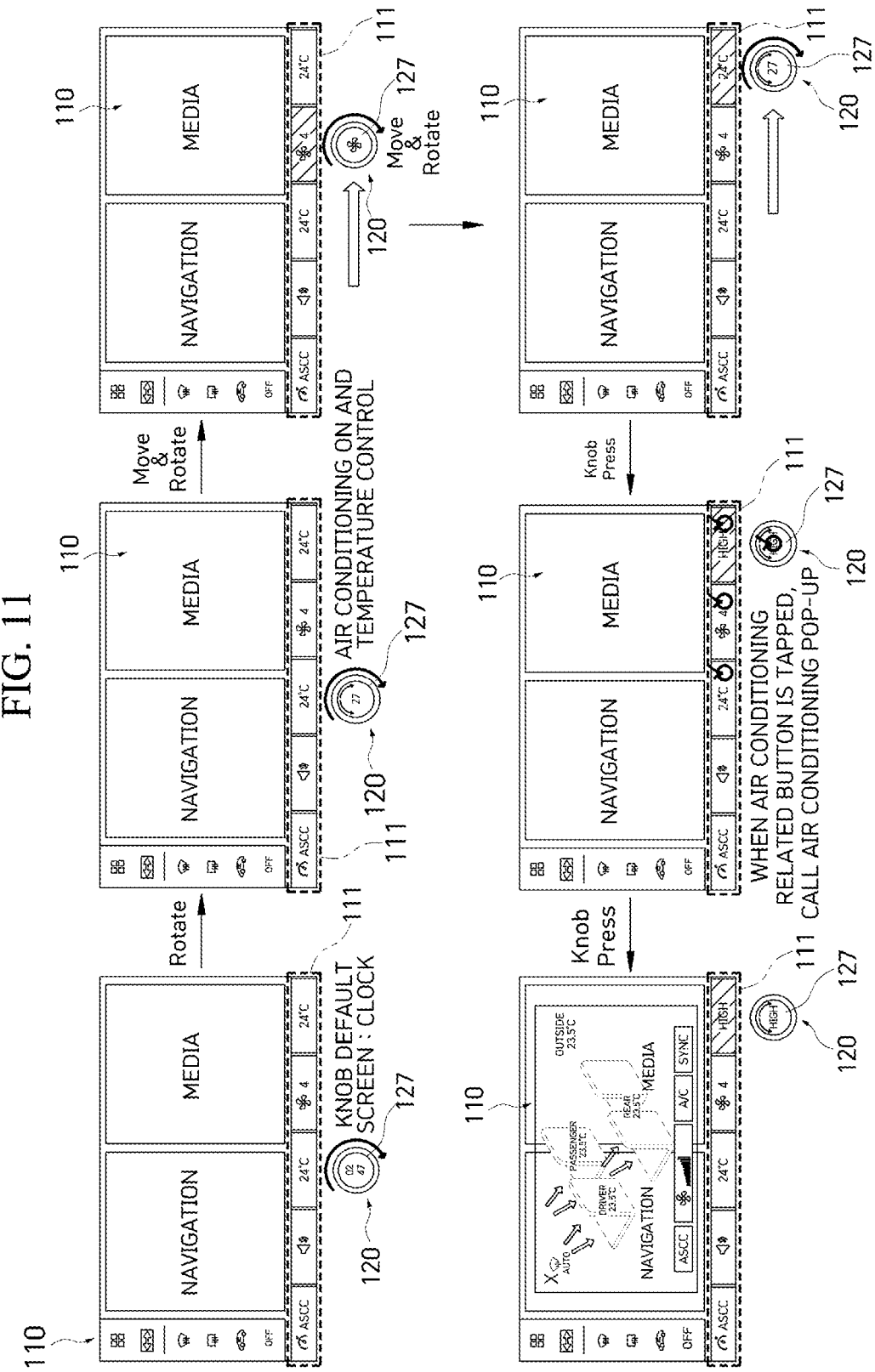
FIG. 11 is an exemplary view illustrating a state in which a vehicle indoor temperature is adjusted by operating the knob in the vehicle display device according to the first embodiment of the disclosure.

FIG. 11 is an exemplary view illustrating a state in which a vehicle indoor temperature is adjusted by operating the knob in the vehicle display device according to the first embodiment of the disclosure.

Referring to FIG. 11, the knob 120 moves to locations for the respective functions partitioned in the function widget 111 of the display 110 and serves as an arrow key so that the user may perform a desired function.

In this case, a liquid crystal display (LCD) 127 of the knob 120 displays an image of the function widget 111 interlocked with a current location of the knob 120. Widgets for the functions displayed on the function widget 111 may be selected according to the left-right movement of the knob 120, and detailed function execution for each function may be adjusted by rotating the knob 120.

Here, the LCD 127 of the knob 120 basically displays a watch screen. The LCD 127 may display images for the various functions through location movement, rotation, pushing, and the like of the knob 120.

Figure 12:
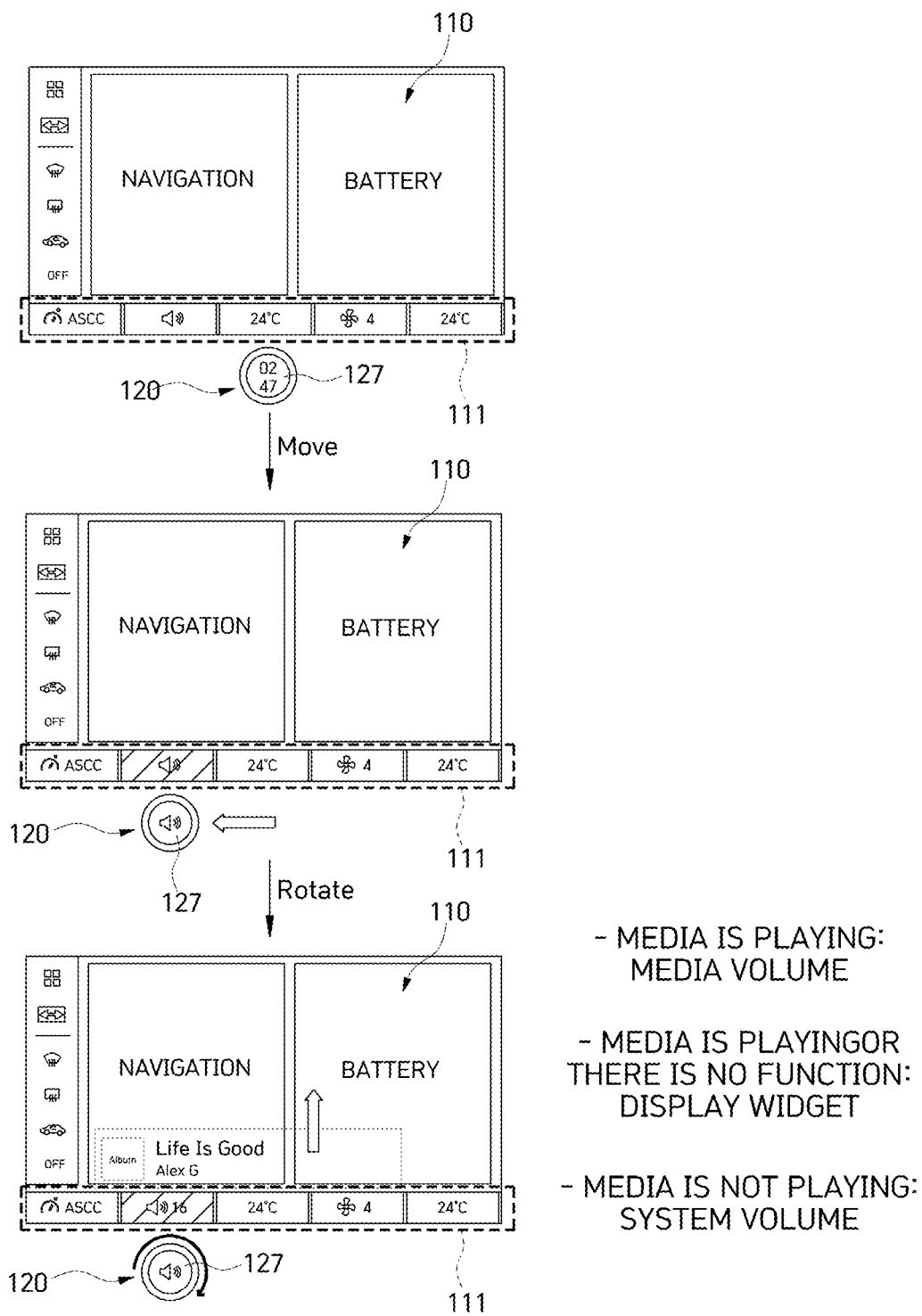
FIG. 12 is an exemplary view illustrating a state in which the volume of a vehicle indoor sound source is adjusted by operating the knob in the vehicle display device according to the first embodiment of the disclosure.

FIG. 12 is an exemplary view illustrating a state in which the volume of a vehicle indoor sound source is adjusted by operating the knob in the vehicle display device according to the first embodiment of the disclosure.

Referring to FIG. 12, the user moves the knob 120 leftward to adjust the volume of the vehicle indoor sound source. In this case, when a corresponding function image is displayed on the LCD 127, the user may specifically operate the corresponding function by rotating the knob 120.

Figure 13:
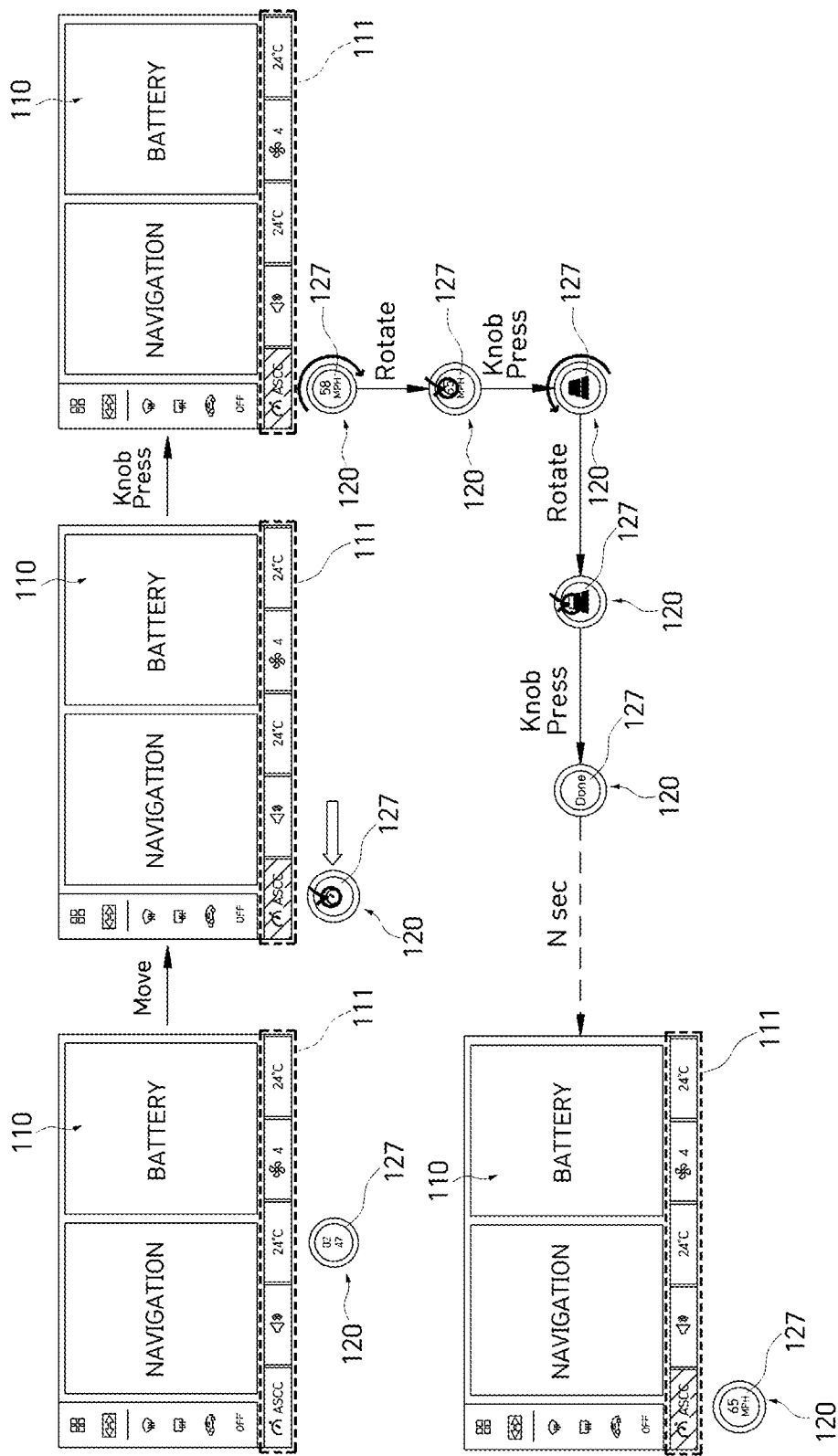
FIG. 13 is an exemplary view illustrating a state in which an advanced smart cruise control (ASCC) function is performed by operating the knob in the vehicle display device according to the first embodiment of the disclosure.

FIG. 13 is an exemplary view illustrating a state in which an advanced smart cruise control (ASCC) function is performed by operating the knob in the vehicle display device according to the first embodiment of the disclosure.

Referring to FIG. 13, when the knob 120 is moved leftward, an ASCC mode may be performed.

Here, the LCD 127 of the knob 120 displays an image related to the ASCC mode, and when the user rotates the knob 120 or pushes a button of the LCD 127, the image of the LCD 127 is displayed in accordance with the corresponding function.

In this case, the corresponding function is displayed on the display 110 according to the operation of the knob 120, and an integrated controller interlocked with the knob 120 performs the corresponding function.

Figure 14:
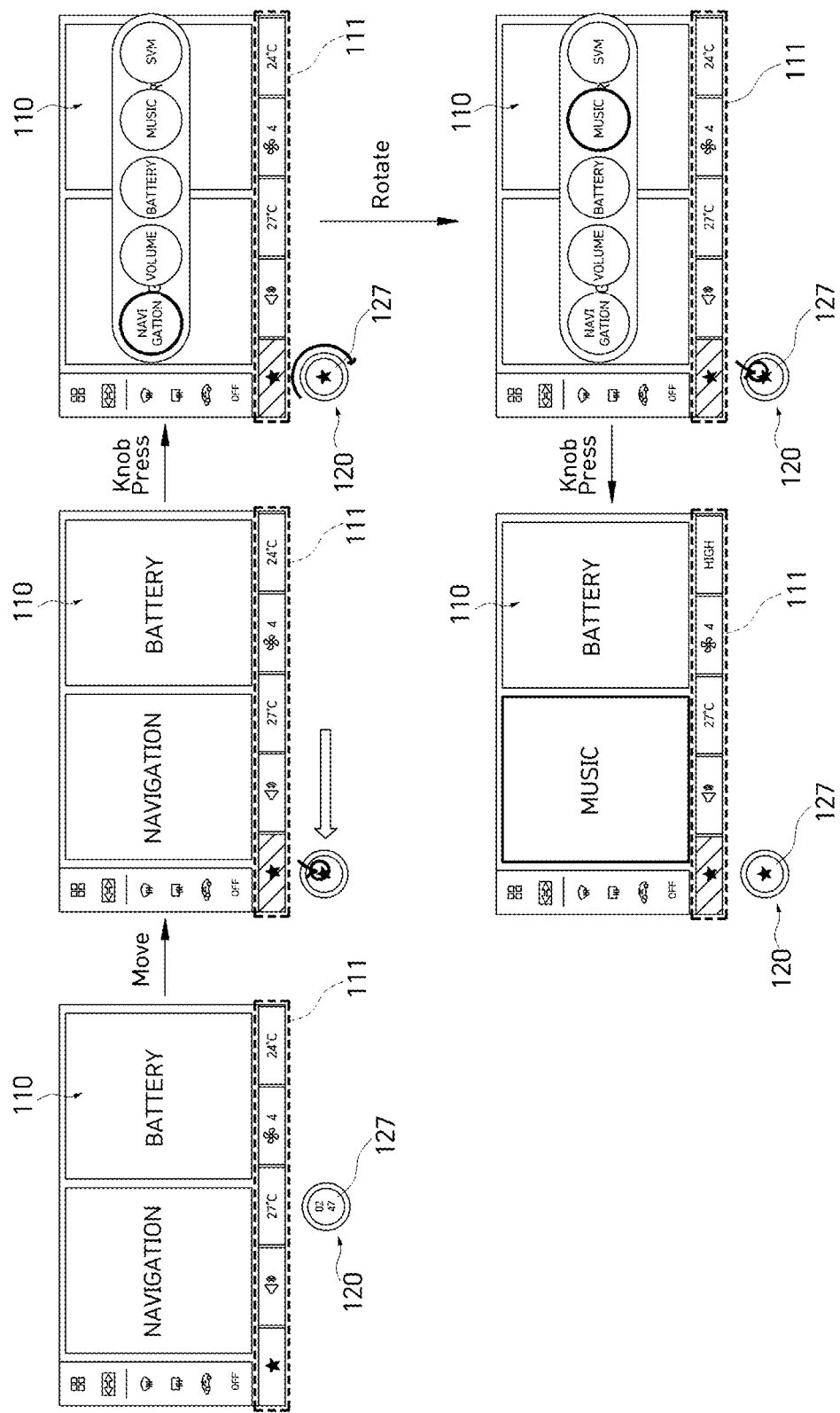
FIG. 14 is an exemplary view illustrating a state in which a user-specified function is performed by operating the knob in the vehicle display device according to the first embodiment of the disclosure.

FIG. 14 is an exemplary view illustrating a state in which a user-specified function is performed by operating the knob in the vehicle display device according to the first embodiment of the disclosure.

Referring to FIG. 14, a shortcut key provided so that the user may quickly access a specified menu may be disposed in a specific area of the function widget 111. Setting of the shortcut key may be implemented as desired by the user, and as illustrated, the shortcut key may be set to a navigation mode, a volume mode, a battery mode, a music mode, and a surround view monitor (SVM) mode.

In this case, when the knob 120 may be rotated or pushed in a state in which the knob 120 is moved to the corresponding shortcut key, the desired mode is performed.

Here, the screen layout of the display 110 or widget setting for each function may be conveniently controlled by the user in a setting mode.

The change structure of the UI of display 110 as seen through FIGS. 8 to 14 is not limited to the first embodiment and may be applied to all embodiments described in the present specification.

Second Embodiment

Figure 15:
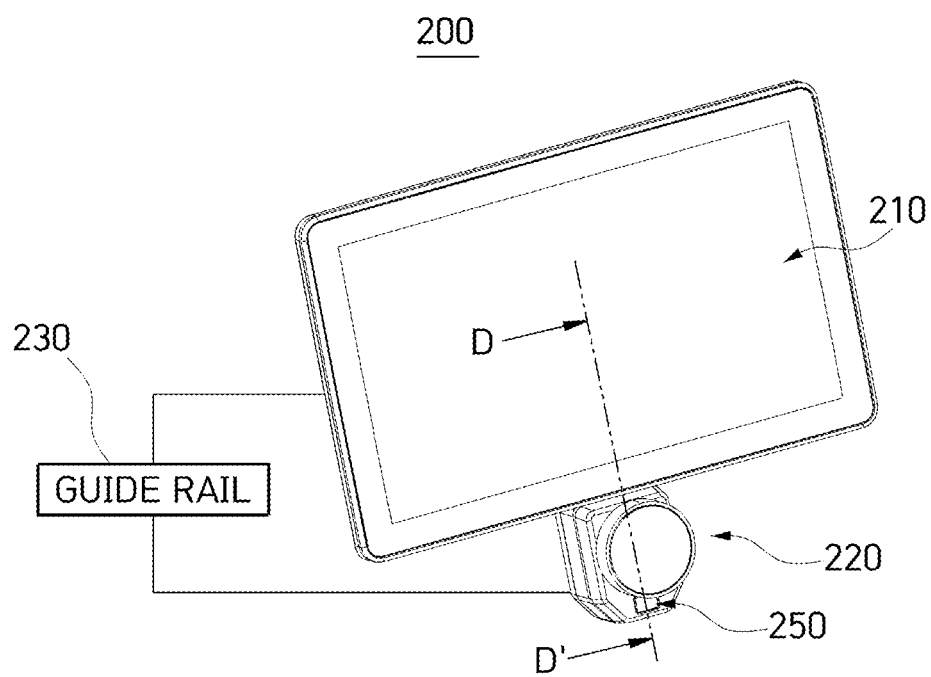
FIG. 15 is a schematic view illustrating a vehicle display device according to a second embodiment of the disclosure.
Figure 16:
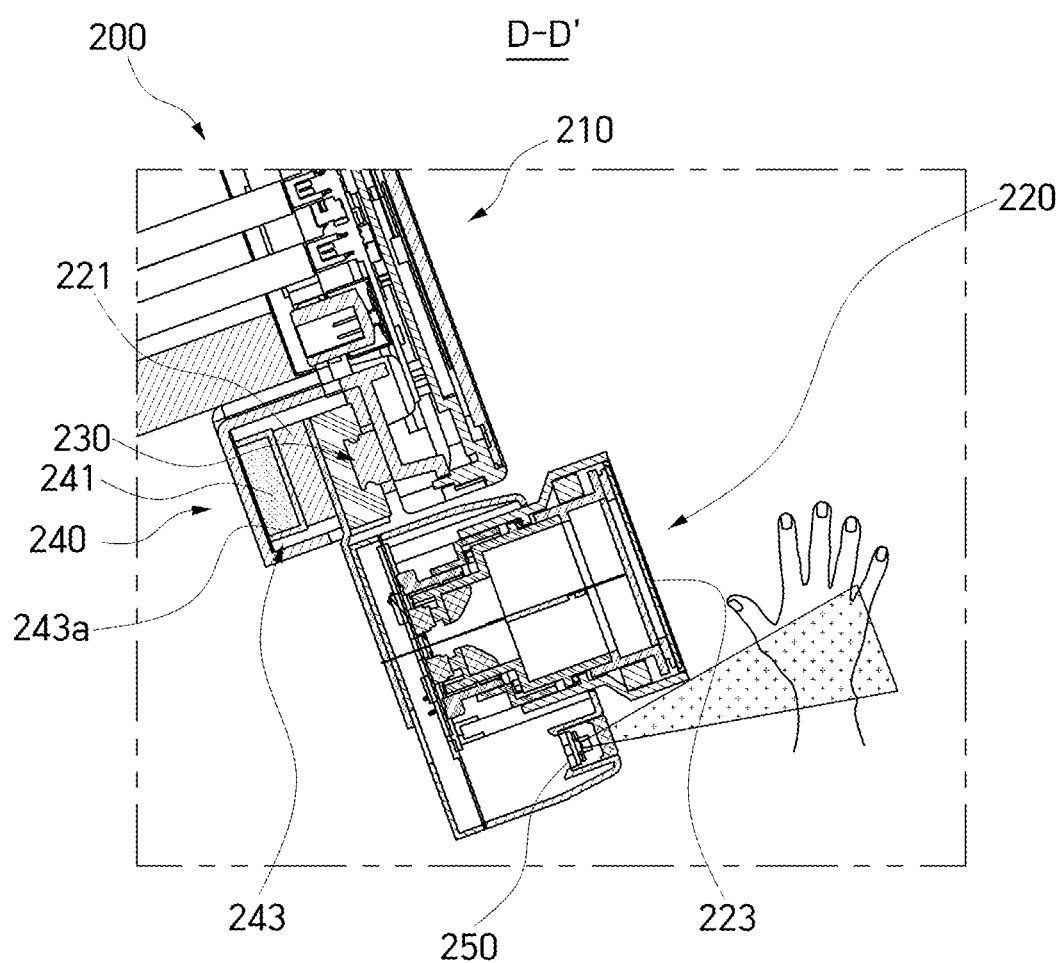
FIG. 16 is an exemplary operation view illustrating a cross-section taken along line D-D' of FIG. 15.
Figure 17:
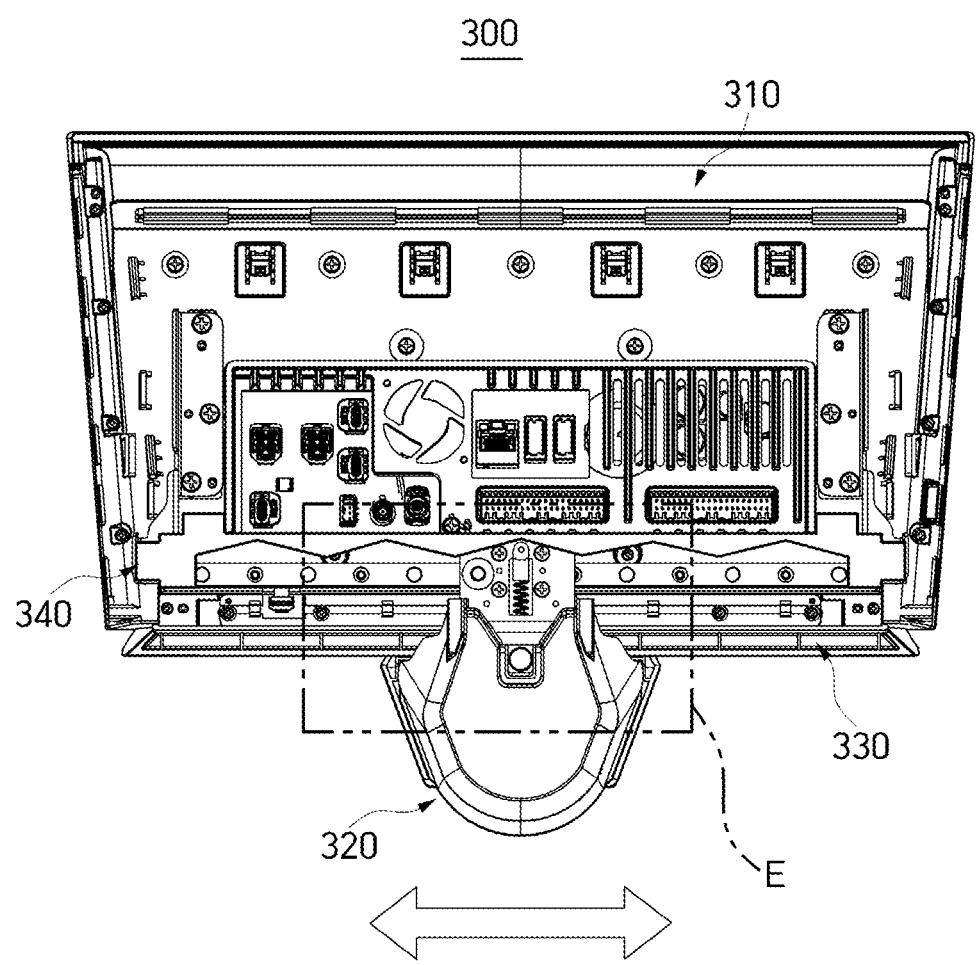
FIG. 17 is a schematic rear view illustrating a vehicle display device according to a third embodiment of the disclosure.
Figure 18:
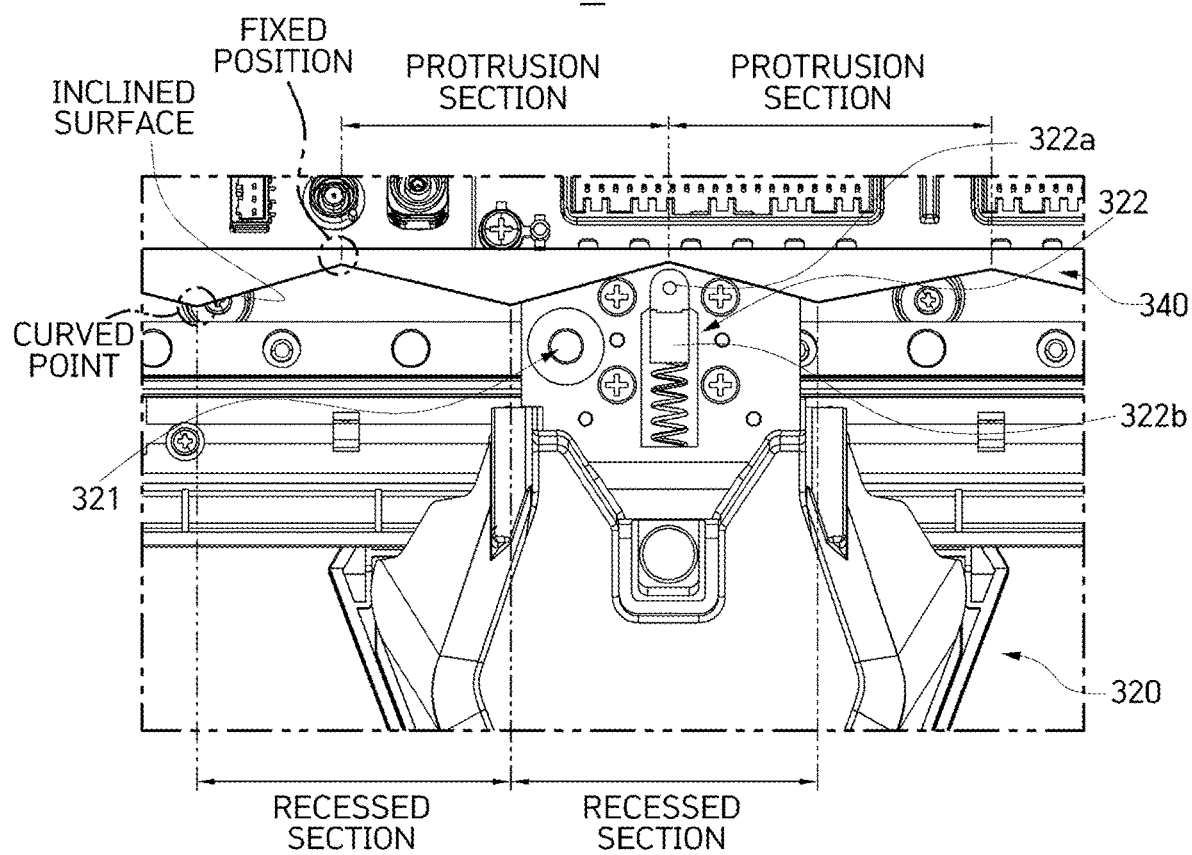
FIG. 18 is an enlarged view illustrating portion E of FIG. 17.
Figure 19:
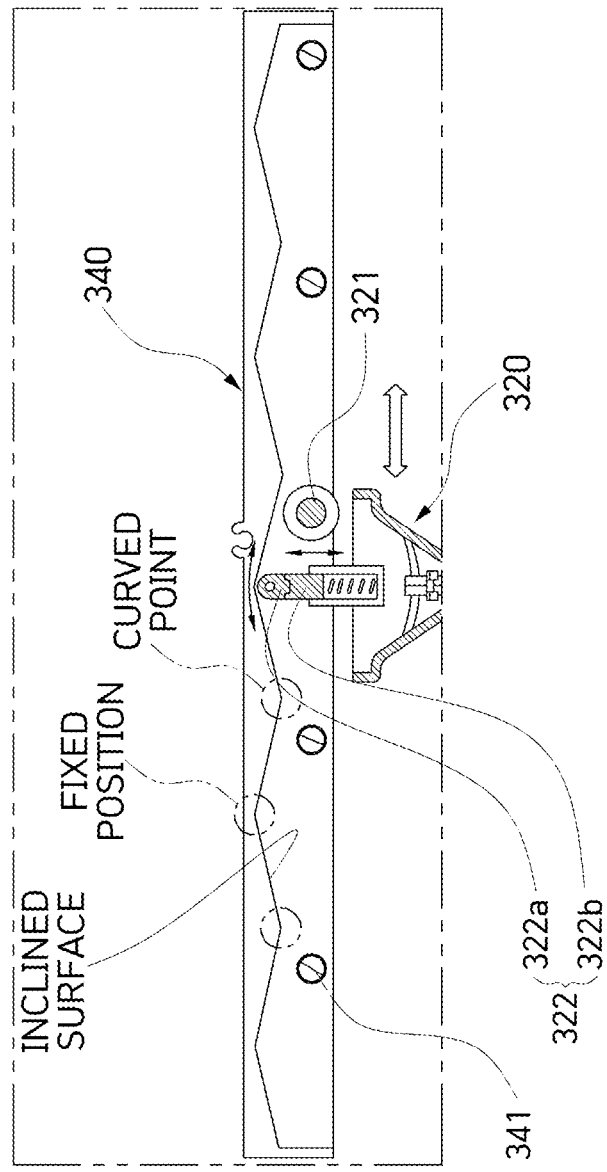
FIG. 19 is a partial cross-sectional view illustrating a state of a spring roller when viewed from the rear in the vehicle display device according to the third embodiment of the disclosure.
Figure 20:
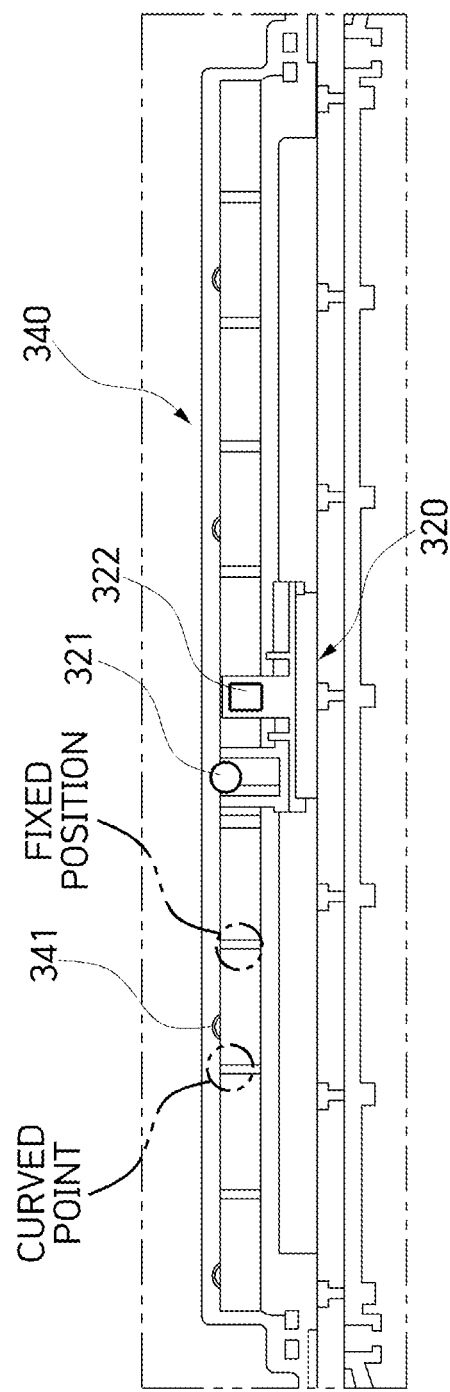
FIG. 20 is a partial cross-sectional view illustrating a state of the ball plunger when viewed from the bottom to the top in the vehicle display device according to the third embodiment of the disclosure.

FIG. 15 is a schematic view illustrating a vehicle display device according to a second embodiment of the disclosure, and FIG. 16 is an exemplary operation view illustrating a cross-section taken along line D-D' of FIG. 15.

Referring to FIGS. 15 and 16, in a vehicle display device 200, the location of a magnetic body 221 of a knob 220 may be corrected due to an attractive force between the magnetic body 221 and a first magnet 241 of a guide part 240 arranged in each functional area of a display 210.

The display 210 and an LCD 223 of the knob 220 are basically made as a capacitive type, and thus touch sensitivity is improved.

When the user allows a conductor (including a body and an object through which a current flows) to approach a preset proximity distance to grip the knob 220, the LCD 223 or the display 210 recognizes this state and interlocks a system.

In this case, an infrared ray (IR) sensor or a time-of-flight (ToF) sensor 250 is provided at a lower end of the knob 220 to recognize a motion of the user.

Of course, the installation location of the IR sensor or the ToF sensor 350 is not limited to the lower end of the knob 220, and the IR sensor or the ToF sensor 350 may be mounted at any location as long as the location is not obstructed by the front view angle.

Meanwhile, a grip part of a rim of the knob 220 may recognize a touch by being connected to an inner electrostatic touch sensor by applying a conductive material. In this case, a flexible printed circuit board (FPCB)-type touch film may be applied to an inner periphery of the rim of the knob 220.

Third Embodiment

FIGS. 17 to 20 illustrate a vehicle display device according to a third embodiment of the disclosure.

Referring to FIGS. 17 to 20, the vehicle display device 300 according to the third embodiment includes a display 310, a knob 320, a guide rail 330, and a guide part 340. Among the above components, a description of the components overlapping components in the above-described embodiment will be omitted.

The guide part 340 is spaced apart from an upper end of the guide rail 330 and provides a guide path in the form of a zigzag-curved shape in a lengthwise direction. Such a guide path divides a plurality of functional areas interlocked with the respective functions displayed on the display 310.

The guide path of the guide part 340 is formed by alternately arranging a protrusion section and a recessed section having an inclined structure.

Here, it is preferable that the uppermost end of the recessed section is a fixed position of the knob 320 corresponding to the functional areas interlocked with the respective functions displayed on the display 310.

Here, the knob 320 includes a spring roller 322 including a roller part 322a that is rotationally adjusted along the guide path of the guide part 340 and an elastic part 322b that is disposed at a lower end of the roller part 322a and may be vertically adjusted.

The guide path of the guide part 340 has a structure in which the protrusion section and the recessed section are alternately arranged as described above, and the protrusion section and the recessed section are formed in an inclined surface structure. The spring roller 322 of the knob 320 may slide down from a curved point to a fixed point of the inclined surface by a pushing force using spring elasticity. Therefore, the location of the knob 320 is automatically corrected to the functional area.

Meanwhile, the guide part 340 may include a locking groove 341 recessed in each of the functional areas located at regular intervals in the lengthwise direction of the guide rail 330.

Here, the locking groove 341 divides location areas of the knob 320 interlocked with the functions of the display 310.

The knob 320 may additionally include a ball plunger 321 of a ball spring type that is fitted in the locking groove 341 when the knob 120 moves in the lengthwise direction of the guide rail 330.

The ball plunger 321 may fix the knob 320 to each of the functional areas linked to the functions of the display 310 with a predetermined force.

Fourth Embodiment

Figure 21:
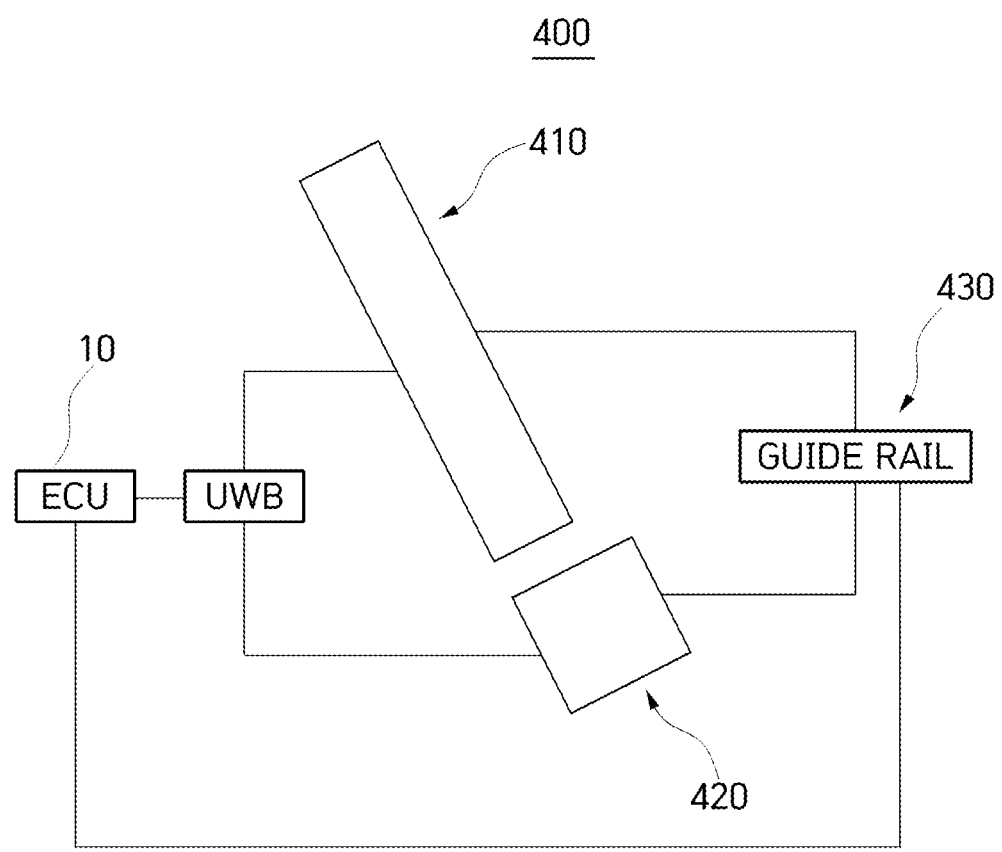
FIG. 21 is a schematic block diagram illustrating a vehicle display device according to a fourth embodiment of the disclosure.
Figure 22:
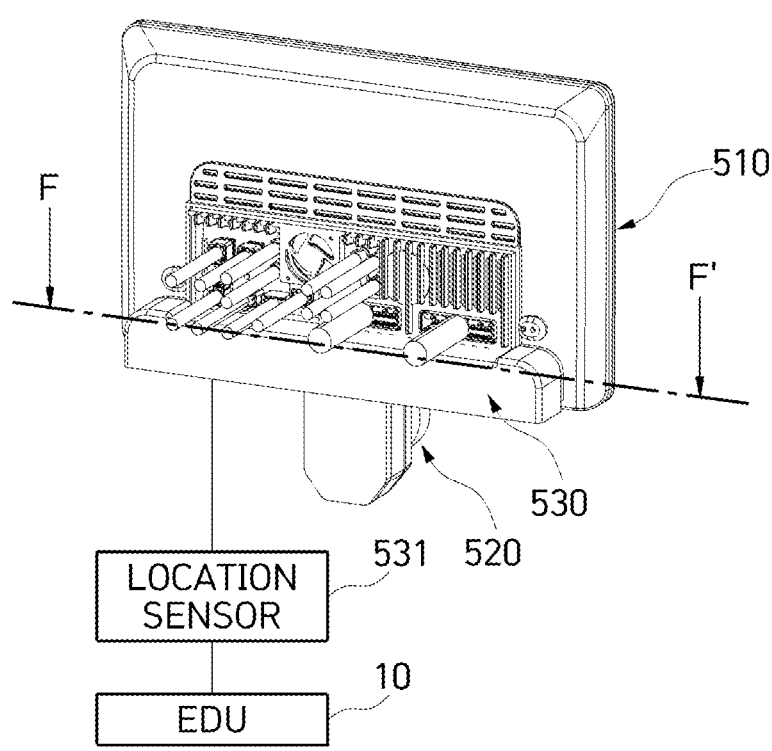
FIG. 22 is a schematic view illustrating a vehicle display device according to a fifth embodiment of the disclosure.
Figure 23:
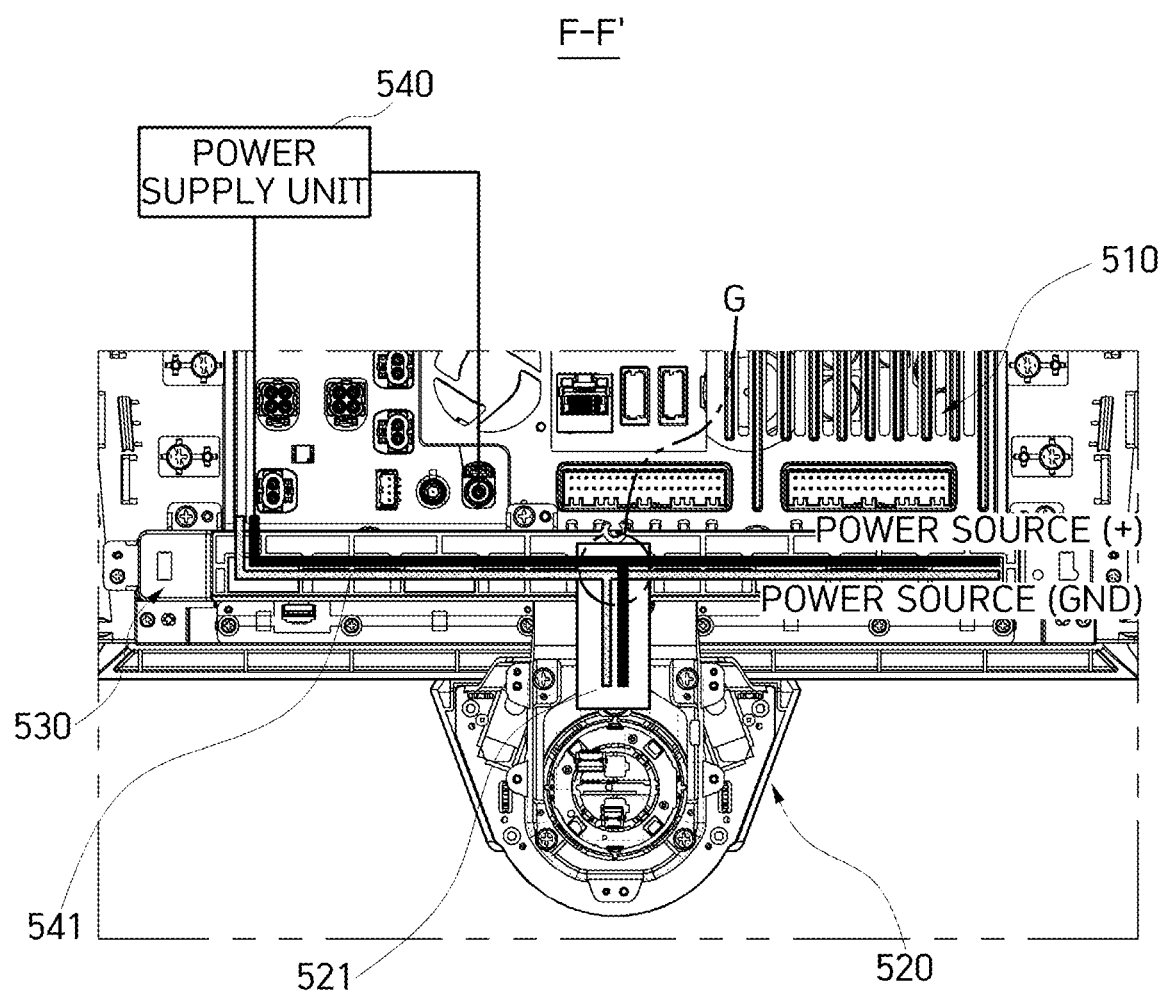
FIG. 23 is a cross-sectional view taken along line F-F' of FIG. 22.
Figure 24:
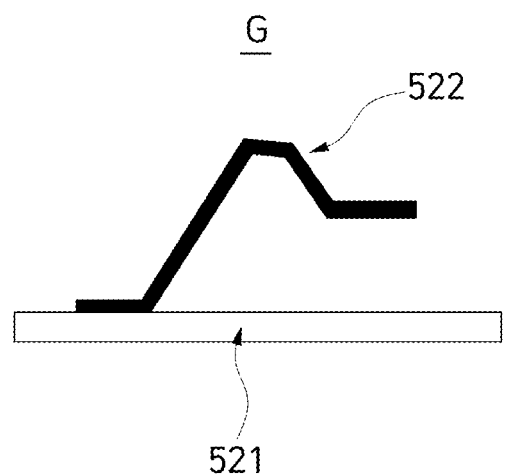
FIG. 24 is an enlarged view illustrating portion G of FIG. 23.
Figure 25:
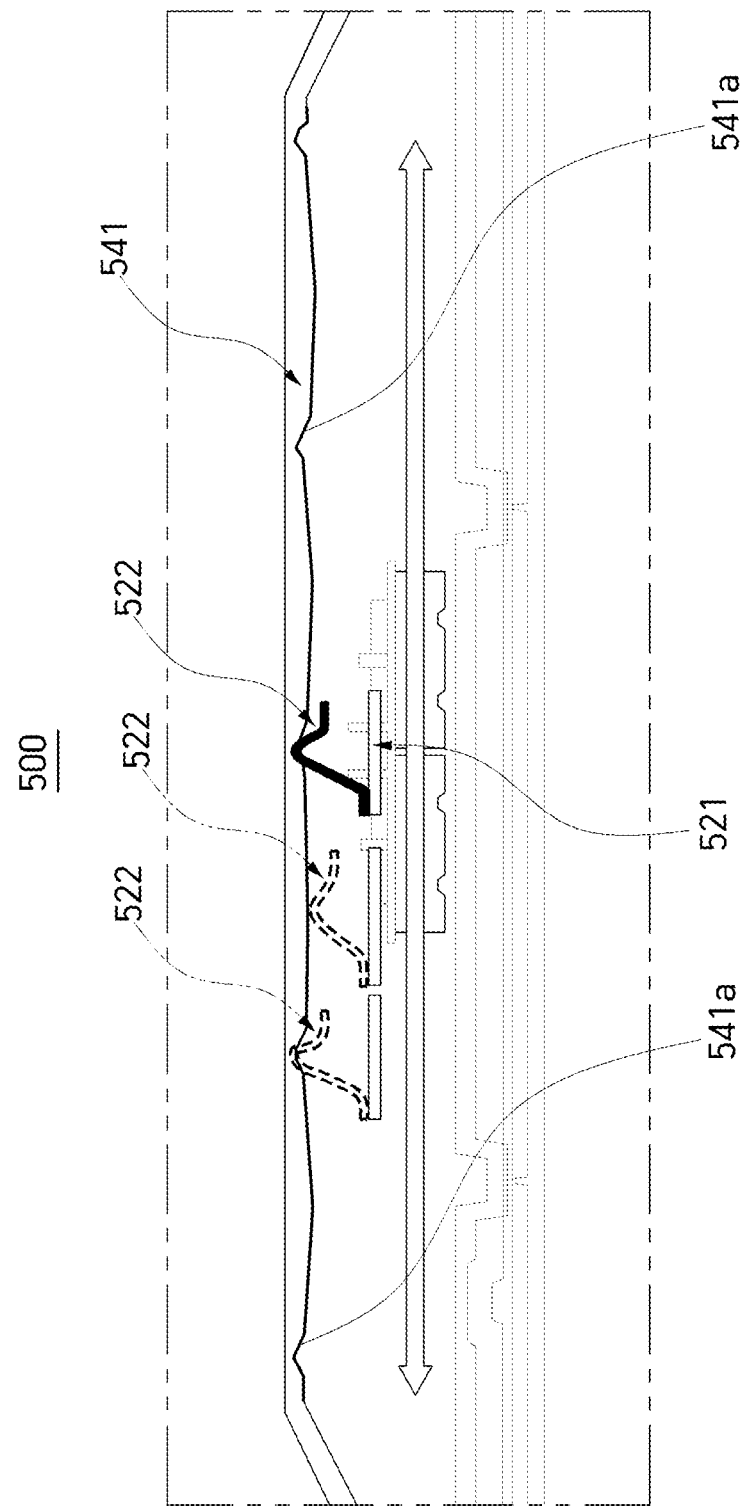
FIG. 25 is a schematic view illustrating an operation example of a ground pin in the vehicle display device according to the fifth embodiment of the disclosure.

FIG. 21 is a schematic block diagram illustrating a vehicle display device according to a fourth embodiment of the disclosure.

Referring to FIG. 21, a knob 420 may be wirelessly connected to a display 410 in an ultra-wide band (UWB) manner.

The UWB is a technology which calculates a distance between subjects by multiplying a signal arrival time between communication subjects by the speed of light using a ToF technology.

Unlike Wi-Fi and Bluetooth, the UWB uses a wide frequency band and may transmit a large amount of information with a high transmission speed using low power.

Positioning using the UWB technology has the advantage in that an error rate is as low as about 20 centimeters, transmittance to an obstacle is high, and the positioning is not affected by other signals such as Wi-Fi.

Accordingly, in a state in which the display 410 and the knob 420 are wirelessly connected in the UWB manner, integrated control can be performed by the ECU 10.

For example, when the knob 420 moves along a guide rail 430, the display 410 interlocked with the knob 420 displays a widget for each of the functions interlocked with the location of the knob 420.

When the user sets the displayed widget, the corresponding function may be performed according to a command of the ECU 10.

Fifth Embodiment

FIGS. 22 to 25 are schematic views illustrating a vehicle display device according to a fifth embodiment of the disclosure.

Referring to FIGS. 22 to 25, a vehicle display device 500 according the fifth embodiment of the disclosure is located between the driver seat and the passenger seat in a cockpit. The vehicle display device 500 includes a display 510, a knob 520, a guide rail 530, and a power supply unit 540.

A basic concept of the vehicle display device 500 is a structure in which the knob 520 and the display 510 are interlocked with each other, and the display 510 switches and displays images for the functions for various pieces of vehicle operation information according to left-right movement of the knob 520.

In this case, as the display 510 is located on a center fascia as a large screen, it is difficult to provide a space in which surrounding electronic units are arranged. Thus, instead of an existing physical button having a function for the vehicle operation information, the display 510 displays the corresponding function as a widget image.

Accordingly, the display 510 may improve intuitiveness and operability by reducing a depth and an operation step of a menu for the corresponding function displayed as a widget.

The knob 520 may be electrically interlocked with the display 510 to selectively operate the various functions of the display 510 according to the left-right movement. This knob 520 has a structural mechanism that may slide at a lower end of the display 510.

The guide rail 530 provides a movement path of the knob 520. In this case, the guide rail 530 divides a plurality of functional areas that are interlocked with the widgets of the functions displayed on the display 510.

Here, the display 510 switches and displays images for the respective functions for the vehicle operation information whenever the knob 520 is located in the functional areas.

The power supply unit 540 supplies power to the display 510 and the knob 520.

The knob 520 may include a ground pin 522 electrically connected to a ground part 541 of the power supply unit 540.

The guide rail 530 includes a plurality of position sensors 531 arranged at regular intervals in a lengthwise direction and arranged in the respective functional areas.

The position sensor 531 may detect a location of the knob 520 through the ground pin 522 to transmit the detected location to the ECU 10.

A lower end of the ground pin 522 may be fixed to an upper end of the knob 520, and an upper end of the ground pin 522 may be in contact with the ground part 541 of the power supply unit 540 while physically having a degree of freedom.

A partial section of a portion of the ground pin 522, the portion being in contact with the ground part 541 of the power supply unit 540, may be formed in a curved shape.

When the knob 520 moves, the ground pin 522 may come into contact with the ground part 541 of the power supply unit 540 while being elastically deformed.

The ground part 541 of the power supply unit 540 may have a pin locking section 541a that is recessed at each portion corresponding to one of the functional areas located at regular intervals in the lengthwise direction of the guide rail 530.

Here, the pin locking section 541a may be in contact with the ground pin 522 of the knob 520 and divide location areas of the knob 520 interlocked with the respective functions of the display 510.

The display 510 may switch and display images for the respective functions for the vehicle operation information whenever the knob 520 is located in the functional areas.

Sixth Embodiment

Figure 26:
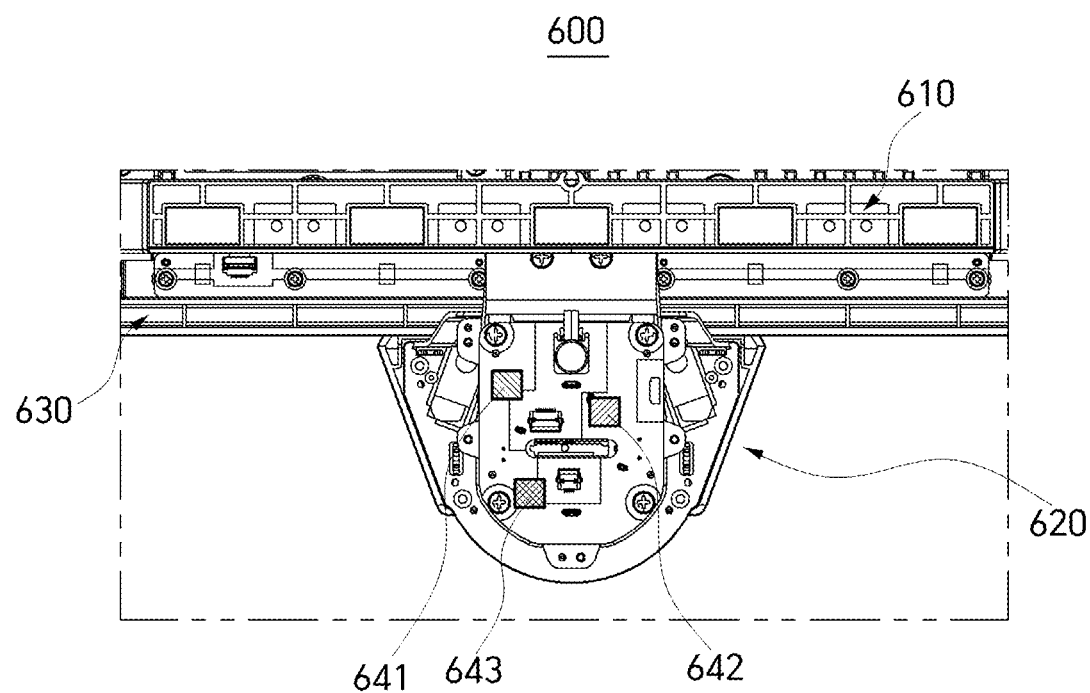
FIGS. 26 to 28 are schematic views illustrating a vehicle display device according to a sixth embodiment of the disclosure.
Figure 27:
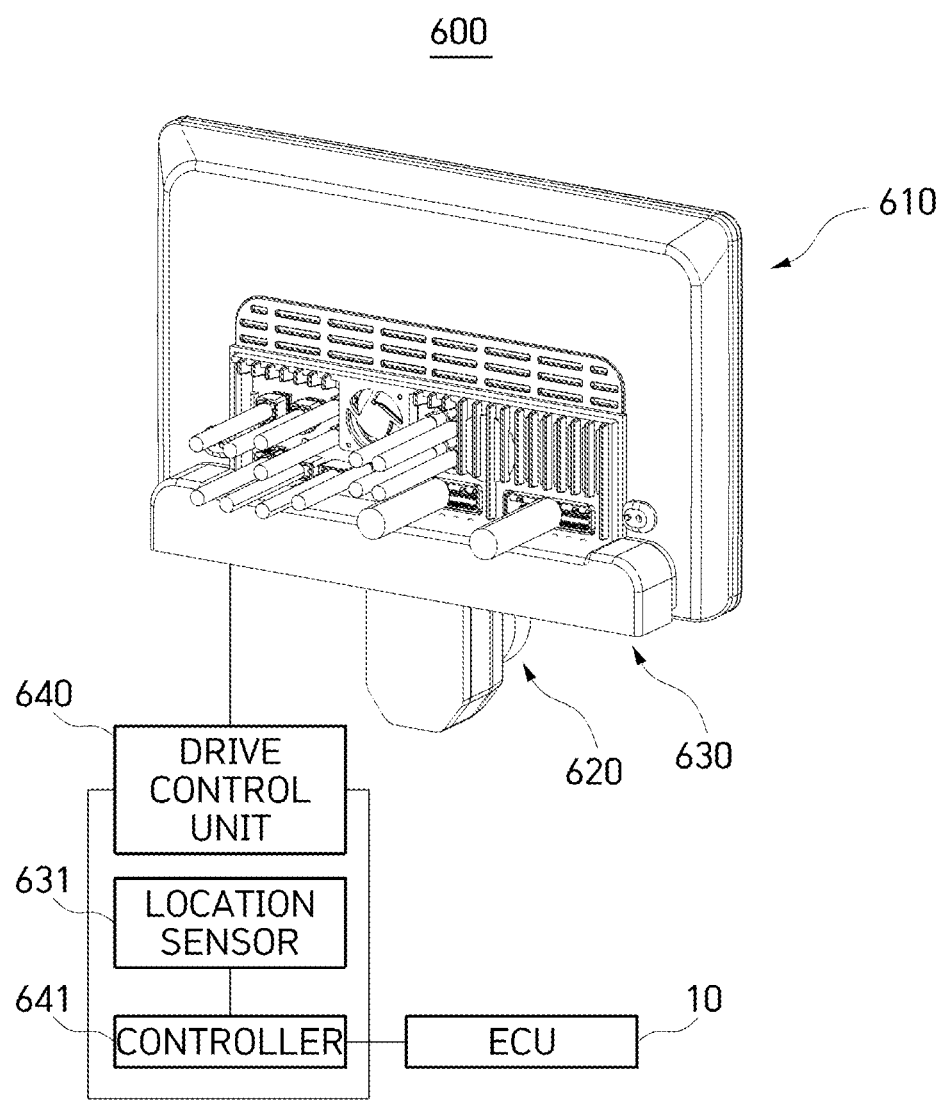
Figure 28:
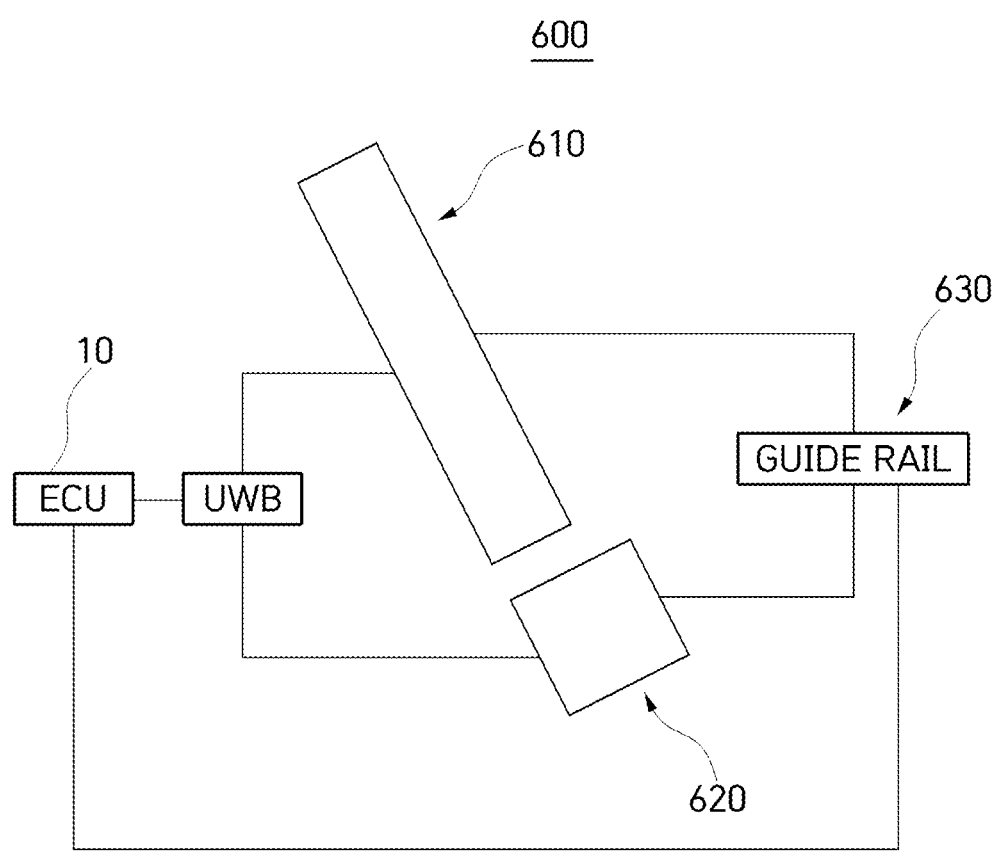

FIGS. 26 to 28 are schematic views illustrating a vehicle display device according to a sixth embodiment of the disclosure.

First, referring to FIGS. 26 and 27, a vehicle display device 600 includes a display 610, a knob 620, and a drive control unit 640.

The display 610 and the knob 620 may be electrically interlocked with each other, and thus the user may selectively operate the corresponding function of the display 210 through left-right movement, rotation, and pushing of the knob 620.

The drive control unit 640 controls the display 610 to display the corresponding function according to the location movement of the knob 620.

Here, the drive control unit 640 includes a guide rail 630, a position sensor 631, and a controller 641.

The guide rail 630 may provide a left-right movement path of the knob 620 and have components embedded therein and related to electronic units. Accordingly, the guide rail 630 may be covered with a separate cover forming an external shape.

The position sensors 631, which are photo sensors, are arranged in the guide rail 630 at regular intervals to detect the location of the knob 620.

The controller 641 may compare a preset data value with a value of the location of the knob 620 detected by the position sensor 631 and control, according to a result value of the comparison, the display 610 to display the corresponding function. In this case, the controller 641 may perform the function of the ECU 10 itself or may be connected to the ECU 10.

Meanwhile, the knob 620 may store a graphical user interface (GUI) by applying a flash memory 642 and a graphic integrated circuit (IC) 643 and transmit the stored (preset) GUI according to a signal state.

Next, referring to FIG. 28, the knob 620 may be wirelessly connected to the display 610 in an ultra-wide band (UWB) manner.

The UWB is a technology which calculates a distance between subjects by multiplying a signal arrival time between communication subjects by the speed of light using a ToF technology.

Unlike Wi-Fi and Bluetooth, the UWB uses a wide frequency band and may transmit a large amount of information with a high transmission speed using low power.

Positioning using the UWB technology has the advantage in that an error rate is as low as about 20 centimeters, transmittance to an obstacle is high, and the positioning is not affected by other signals such as Wi-Fi.

Accordingly, in a state in which the display 610 and the knob 620 are wirelessly connected in the UWB manner, integrated control can be performed by the ECU 10.

For example, when the knob 620 moves along the guide rail 630, the display 610 interlocked with the knob 620 displays a widget for each of the functions interlocked with the location of the knob 620.

When the user sets the displayed widget, the corresponding function may be performed according to a command of the ECU 10.

According to the disclosure, in a vehicle display device, a sliding knob and a display are integrated, and thus the degree of freedom of a slimmed cockpit room can be secured, and intuitive operation convenience can be realized.

In particular, as one knob is moved in a left-right direction, a display menu can be efficiently selected through a corresponding interlocking operation, and as operation steps are reduced, intuitiveness and operability can be improved.

Moreover, a location recognition rate of the knob can be improved by forming a guide part that corrects the location of the sliding knob.

In addition, since the knob and the display are connected using an elastically deformable ground pin, a disconnection problem caused by using wire connection can be solved.

The disclosure is not limited to the above-described embodiments and can be variously modified and implemented without departing from the allowable scope of the technical spirit of the disclosure.

What is claimed is:

1. A vehicle display device comprising:
    a display configured to display an image showing a plurality of vehicle operation functions;
    a knob electrically coupled to the display and configured to be laterally movable by a vehicle driver to select one of the plurality of vehicle operation functions displayed on the display;
    a guide rail configured to provide a lateral movement path for the knob, the guide rail being divided into a plurality of functional areas respectively associated with the plurality of vehicle operation functions displayed on the display; and
    a guide part extending along the guide rail and including a plurality of first and second magnets arranged alternately in a lengthwise direction of the guide rail, wherein:
    each of the first and second magnets has a front portion facing in a first direction toward the knob,
    the front portion of each first magnet has a first polarity, and the front portion of each second magnet has a second polarity different from the first polarity, and
    the knob includes a magnetic body having a rear portion facing in a second direction toward the guide part and having the second polarity.

2. The vehicle display device of claim 1, wherein:
    the first magnets are respectively arranged at the functional areas of the guide rail, and
    the magnetic body is in contact with the guide part.

3. The vehicle display device of claim 2, wherein the guide part further includes a cover plate having a first seating groove at which the first magnet is positioned and a second seating groove at which the second magnet is positioned.

4. The vehicle display device of claim 3, wherein:
    the first seating groove and the second seating groove are arranged with an interval therebetween in the lengthwise direction of the guide rail, each of the first and second seating grooves having an open surface, and
    the open surface of the first seating groove is positioned outside the guide rail, and the open surface of the second seating groove is positioned inside the guide rail.

5. The vehicle display device of claim 4, wherein:
    the first seating groove has a size corresponding to that of the first magnet, and the second seating groove has a size corresponding to that of the second magnet.

6. The vehicle display device of claim 1, wherein:
the guide part includes a plurality of locking grooves respectively positioned at the functional areas and arranged at a regular interval in the lengthwise direction of the guide rail, and
the locking grooves divide the guide part into a plurality of location areas respectively associated with the vehicle operation functions displayed on the display.

7. The vehicle display device of claim 6, wherein the knob includes a ball spring-type ball plunger configured to fit into each of the locking grooves.

8. The vehicle display device of claim 2, wherein the knob is spaced apart from the first magnet by a predetermined gap.

9. The vehicle display device of claim 1, wherein the knob is wirelessly connected to the display via an ultra-wide band (UWB) connection.

10. The vehicle display device of claim 1, wherein the knob includes:
a liquid crystal display (LCD) configured to display a widget corresponding to one of the vehicle operation functions selected by the vehicle driver; and
a time-of-flight (ToF) sensor positioned at a lower portion of the knob and having a view angle corresponding to an image display direction of the LCD.

11. The vehicle display device of claim 1, wherein:
the guide rail includes a plurality of position sensors respectively arranged at the functional areas at a regular interval in the lengthwise direction of the guide rail, and
the position sensors are configured to detect the location of the knob and transmit the detected location of the knob to an electronic control unit (ECU).

12. A vehicle display device comprising:
a display configured to display an image showing a plurality of vehicle operation functions;
a knob electrically coupled to the display and configured to be movable by a vehicle driver to select one of the vehicle operation functions displayed on the display;
a guide rail configured to provide a movement path for the knob; and
a guide part disposed over and spaced apart from an upper end of the guide rail, configured to provide a guide path having a zigzag-curved shape extending in a lengthwise direction of the guide rail, and divided into a plurality of functional areas respectively associated with the vehicle operation functions displayed on the display,
wherein the knob has a spring roller including (1) a roller part in contact with the guide part and configured to rotate when the knob is moved along the movement path and (2) an elastic part coupled to and supporting the roller part and having an adjustable height to keep the roller part in contact with the guide part.

13. The vehicle display device of claim 12, wherein the guide path provided by the guide part has a plurality of protrusion sections and a plurality of recessed sections arranged alternately and having an inclined structure.

14. The vehicle display device of claim 13, wherein an uppermost end of each recessed section is at a fixed position on the knob corresponding to each of the functional areas of the guide part.

15. The vehicle display device of claim 12, wherein:
the guide part includes a plurality of locking grooves positioned corresponding to the functional areas and arranged at a regular interval in the lengthwise direction of the guide rail, and
the locking grooves divide the guide part into a plurality of location areas respectively associated with the vehicle operation functions displayed on the display.

16. The vehicle display device of claim 15, wherein the knob includes a ball spring-type ball plunger configured to fit into each of the locking grooves.

17. A vehicle display device comprising:
a display configured to display an image showing a plurality of vehicle operation functions;
a knob electrically coupled to the display and configured to be moved by a vehicle driver to select one of the plurality of vehicle operations;
a guide rail configured to provide a movement path for the knob and being divided into a plurality of functional areas respectively corresponding to the plurality of vehicle operation functions displayed on the display; and
a power supply unit configured to power the display and the knob and including an electrical ground part, wherein:
the knob includes a ground pin electrically connected to the electrical ground part of the power supply unit, and
the guide rail includes a plurality of position sensors respectively arranged at the plurality of functional areas with a regular interval therebetween in a lengthwise direction of the guide rail, the position sensors configured to detect a location of the knob through the ground pin.

18. The vehicle display device of claim 17, wherein the position sensors are configured to transmit the detected location of the knob to an electronic control unit (ECU).

19. The vehicle display device of claim 17, wherein:
a lower end of the ground pin is fixed to an upper end of the knob, and
an upper end of the ground pin is in contact with the ground part of the power supply unit.

20. The vehicle display device of claim 17, wherein a partial section of a portion of the ground pin that is in contact with the ground part of the power supply unit has a curved shape.

* * * * *